United States Patent
Cheung

(10) Patent No.: US 6,781,956 B1
(45) Date of Patent: Aug. 24, 2004

(54) SYSTEM AND METHOD FOR PRIORITIZING PACKETIZED DATA FROM A DISTRIBUTED CONTROL ENVIRONMENT FOR TRANSMISSION THROUGH A HIGH BANDWIDTH LINK

(75) Inventor: Colman Cheung, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/398,937

(22) Filed: Sep. 17, 1999

(51) Int. Cl.[7] .............................................. G01R 31/08
(52) U.S. Cl. ................................... 370/235.1; 370/252
(58) Field of Search ............................. 370/230, 230.1, 370/231, 232, 233, 234, 235, 235.1, 252, 442, 443, 444, 468, 477

(56) References Cited

U.S. PATENT DOCUMENTS

| | | |
|---|---|---|
| 4,429,383 A | 1/1984 | Finck et al. |
| 4,644,532 A | 2/1987 | George et al. |
| 4,891,805 A | 1/1990 | Fallin |
| 4,903,261 A | 2/1990 | Baran et al. |
| 4,980,886 A | 12/1990 | Bernstein |
| 5,014,265 A | 5/1991 | Hahne et al. |
| 5,115,431 A | 5/1992 | Williams et al. |
| 5,274,641 A | 12/1993 | Shobatake et al. |
| 5,287,347 A * | 2/1994 | Spanke ........................ 370/60 |
| 5,303,237 A | 4/1994 | Bergman et al. |
| 5,313,467 A | 5/1994 | Varghese et al. |
| 5,315,588 A | 5/1994 | Kajiwara et al. |
| 5,392,280 A | 2/1995 | Zheng |
| 5,412,647 A | 5/1995 | Giroux et al. |
| 5,426,640 A | 6/1995 | Hluchyj et al. |
| 5,434,866 A | 7/1995 | Emerson et al. |
| 5,446,733 A | 8/1995 | Tsuruoka |
| 5,448,564 A | 9/1995 | Thor |

(List continued on next page.)

OTHER PUBLICATIONS

American National Standard for Telecommunications: "Integrated Services Digital Network (ISDN) Architecture Framework and Service Description for Frame–Relaying Bearer Service—Addendum #1," T1S1/90–175R4, pp. 1–11.

American National Standard for Telecommunications: "Integrated Services Digital Network (ISDN) Architecture Framework and Service Description for Frame–Relaying Bearer Service—Addendum #1," T1S1/90–175R4, pp. 1–11. (copy included).

*Primary Examiner*—Chau Nguyen
*Assistant Examiner*—Duc Duong
(74) *Attorney, Agent, or Firm*—Marger Johnson & McCollom, PC

(57) ABSTRACT

A priority scheme is provided for ports assigned to respective channel units in a channel bank. The priority scheme is based on an amount of preallocated bandwidth unused by channel unit ports. A first water level in a first bucket is associated with an amount of allotted bandwidth unused by the channel unit and a second water level in a second bucket is associated with an amount of unused allotted bandwidth exceeding an overflow level of the first bucket. A high priority value is derived from the first water level when the first water level is above zero. A medium priority value is derived from the second water level when the first water level is equal to zero. A low priority value is derived when both water levels are zero. In another aspect of the invention, the total port bandwidth utilization history is preferably accounted for. It is differentially aged to favor recent history over older history, and optionally further compensated to favor long quiet times.

49 Claims, 14 Drawing Sheets

U.S. PATENT DOCUMENTS

| | | |
|---|---|---|
| 5,459,723 A | 10/1995 | Thor |
| 5,461,626 A | 10/1995 | Takase et al. |
| 5,463,620 A | 10/1995 | Sriram |
| 5,467,344 A | 11/1995 | Solomon et al. |
| 5,473,599 A | 12/1995 | Li et al. |
| 5,473,665 A | 12/1995 | Hall et al. |
| 5,502,712 A | 3/1996 | Akita |
| 5,506,844 A | 4/1996 | Rao |
| 5,513,172 A | 4/1996 | Shikama et al. |
| 5,515,373 A | 5/1996 | Lynch et al. |
| 5,521,914 A | 5/1996 | Mavraganis et al. |
| 5,524,007 A | 6/1996 | White et al. |
| 5,528,579 A | 6/1996 | Wadman et al. |
| 5,533,017 A | 7/1996 | Thor |
| 5,553,071 A | 9/1996 | Aranguren et al. |
| 5,598,581 A | 1/1997 | Daines et al. |
| 5,682,386 A | 10/1997 | Arimilli et al. |
| 5,805,595 A | 9/1998 | Sharper et al. |
| 6,052,379 A * | 4/2000 | Iverson et al. ............... 370/442 |
| 6,147,970 A * | 11/2000 | Troxel ......................... 370/235 |
| 6,308,214 B1 * | 10/2001 | Plevyak et al. .............. 709/233 |
| 6,456,593 B1 * | 9/2002 | Iverson et al. ........... 370/235.1 |

* cited by examiner

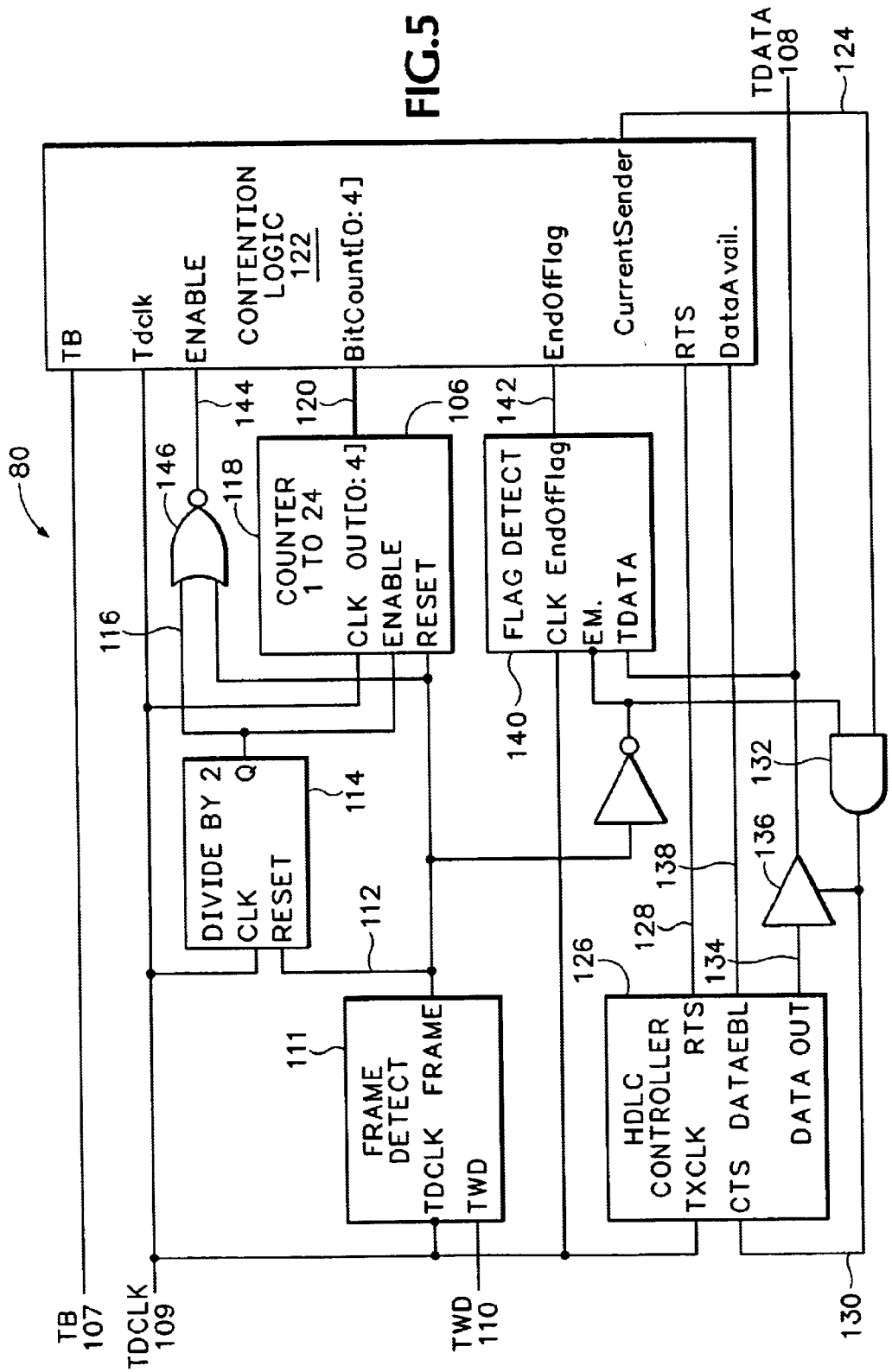

| STEPS IN PRIORITY ARY INDEX | PRIORITY LEVEL |
|---|---|
| 0 | 14 |
| 1 | 13 |
| 2 | 12 |
| 3,4 | 11 |
| 5,6 | 10 |
| 7,8 | 9 |
| 9-11 | 8 |
| 12-14 | 7 |
| 15-17 | 6 |
| 18-21 | 5 |
| 22-25 | 4 |
| 26-30 | 3 |
| 31-38 | 2 |
| 39-49 | 1 |
| 50-63 | 0 |

FIG.15

| EXCESS BUCKET WATERMARK | PRIORITY |
|---|---|
| 0-8 BYTES | 7 |
| 9-16 BYTES | 8 |
| 17-24 BYTES | 9 |
| 25-32 BYTES | 10 |
| 33-40 BYTES | 11 |
| 41-48 BYTES | 12 |
| 49-56 BYTES | 13 |
| 57-64 BYTES | 14 |

FIG.16

| EXCESS TRAFFIC RATIO | PRIORITY LEVEL |
|---|---|
| 2-0 | 6 |
| 4-2 | 5 |
| 8-4 | 4 |
| 16-8 | 3 |
| 32-16 | 2 |
| 64-32 | 1 |
| OVER 64 | 0 |

FIG.17

SYSTEM AND METHOD FOR PRIORITIZING PACKETIZED DATA FROM A DISTRIBUTED CONTROL ENVIRONMENT FOR TRANSMISSION THROUGH A HIGH BANDWIDTH LINK

BACKGROUND OF THE INVENTION

1. Field of the Invention

The present invention is related to the field of congestion management for networks, and more specifically to a congestion control algorithm for allocating, among competing packetized data from different ports in a distributed control environment such as a channel bank, priority for transmission through a high bandwidth link. A typical such link is a time division multiplexing link, with its time division multiplexing scheme ignored for communicating packetized data.

2. Description of the Related Art

In the early 1970s, telephone service began using a time division multiplexed (TDM) communications system, known as D4, that used a channel bank to multiplex and communicate time division multiplexed (TDM) voice signals over a communications link, such as a T1 link. The channel bank typically carried 24 digital voice signals between central telephone offices using only one pair of wires in each direction instead of the normal 24 pairs of wires required to communicate the 24 voice signals in analog form. This capability was achieved by digitizing and time division multiplexing the 24 analog voice signals into 24 channels or timeslots. In the TDM system, each of the channels is allocated a predetermined, equal amount of time (corresponding to a predetermined bandwidth) within each frame of the T1 link to communicate any data. Each channel is always allocated its predetermined amount of time, even if that channel has no voice data to transmit. In addition to communicating voice signals, these systems can also communicate digital data because the D4 system was designed to handle digital data. The systems are still widely used today to carry voice traffic between central telephone offices. Therefore, the communications hardware and the network necessary for this D4 system are readily available.

A typical time division multiplexed (TDM) system, such as the D4 system, has a data rate of 1.544 million bit per second (Mbps) wherein timeslots of 64 Kbps are fixedly allocated to each channel unit. The 1.544 Mbps data rate is typically known as a T1 carrier.

FIG. 1 is a block diagram of a conventional time division multiplexed (TDM) communications system channel bank 20. The channel bank communicates a plurality of signals from a plurality of users over a communications link wherein each of the users has a specified timeslot assigned to it, in which it can communicate data over the communications link. The TDM system shown is a D4 channel bank, but the invention is not limited to a particular type of channel bank.

The D4 channel bank 20 can be used by a plurality of users 22 connected to a plurality of channel units 24–28, and the plurality of channel units can be known as a channel bank. In the D4 system shown, there are a maximum of twenty-four users and a maximum of twenty-four channel units so that there is a one-to-one correspondence between channel units and users. As described below in more detail, each channel unit has a fixed 8-bit timeslot assigned to it, in which that channel can communicate data. Each channel unit can communicate analog voice signals or digital data signals, as described below. For transmission, the data generated by any channel can be sampled eight thousand (8000) times per second so that eight thousand 8-bit samples (for a total of 64 Kbps data rate for each channel) can be generated for each channel, as described below in more detail.

The details of the D4 TDM communications system will now be described. For time division multiplexing in a D4 system, each of the twenty-four analog voice signals are low pass filtered and sampled at a rate of 8000 time per second by a voice card. Each of these analog samples are digitized to form 8-bit digital samples by a well-known analog-to-digital converter, and then these twenty-four 8-bit digital samples are concatenated together to form a 192-bit signal as shown in FIG. 2. These voice cards also communicate signaling information, such as ringing indication, idle indication or busy indication, required by the voice signals using two signaling bits known as A and B.

Returning to FIG. 1, the TDM D4 system can also send digital data using a data card to replace one or more of the voice cards. For digital data, there is no need to sample or digitize the digital data, and there are not any signaling information. Therefore, the D4 system has a TNEN bus for indicating to the transmit unit and the receive unit whether analog voice signals or digital data is being communicated. As described above, the common equipment acts as an interface between the transmit and receive unit and the T1 link.

During the transmission of data by a channel unit, the channel unit transmits the analog voice or digital data to a backplane bus 30, which in turn sends the data from all of the channel units to a transmit unit 32. The transmit unit converts the analog voice signals to digital signals, and then sends the digital signals (voice and data) to a common equipment 34. The common equipment transmits the digital data over a T1 link 36. As is well known, the T1 link can have a data transfer rate of 1.544 million bits per second (Mbps). In addition, the common equipment can control the channel units in order to fixedly allocate a data rate to each channel unit using a control bus.

In more detail, during transmission, the transmit unit gives each channel unit some addressing signals, TSP and TSQ that provide a unique address for each channel unit and indicates to each channel unit where in the T1 frame the timeslot for that channel unit is located. The transmit unit also gives each channel unit that communicates digital data a clock signal, TDCLK, and a serial data bus, TDATA. Each data channel unit transmits digital data over the TDATA bus only during its timeslot. The voice cards, also known as voice channel units, do not use the TDATA bus.

For the transmission of analog voice signals, a slightly different system is used, because, at the time that the D4 system was designed, analog to digital (A/D) and D/A converters were too expensive. A single high speed A/D converter was built into the transmit unit and a D/A converter into the receive unit to handle the conversion of analog voice signals. Therefore, there is a bus, called TPAM, between the voice channel units and the transmit unit that carries analog signals. Thus, during its assigned timeslot, a voice channel unit is enabled by a TWD signal to place an analog voltage onto the TPAM bus. The signaling information, as described above, for the voice signals are sent to the transmit unit over a TA and TB bus. The digital data channel units do not use the TPAM, TA or TB buses.

For receiving voice and digital data signals, the receive unit provides addressing leads, RSP and RSQ, to the channel units that provide a unique receive address to each channel unit, so that each channel unit can identify its timeslot of the T1 link. Each channel unit also receives a clock signal, RCLK. The digital channel units also receive the received digital data on a RNPCM bus, where the channel unit can latch onto the appropriate 8 bits of digital data during its timeslot. For analog signals, the signals are converted back into analog signals by the D/A converter in the receive unit, and then placed on an RPAM bus. Then a RWD signal from the receive unit indicates to each channel unit when to store the analog voltage on the RPAM bus. The signaling information is placed on a RSAB bus. To more fully understand the TDM system, the format of the TDM signal will be briefly described.

FIG. 2 is a schematic of a format of the signals generated by the channel bank shown in FIG. 1. A TDM signal 50 can be 193 bits long, derived from an 8-bit sample 52 for each of the twenty-four channel units and a framing bit 54. Each of the channels can be sampled eight thousand (8000) times per second, so that the total data rate for each channel is sixty-four thousand bits per second (64 Kbps), and the total data rate of all of the data and the framing bit is equal to the total data rate of the T1 link, which is 1.544 Mbps. However, if one or more of the channel units does not have any data to communicate, then the timeslot assigned to that channel unit will be unused, and thus, some bandwidth of the T1 link is wasted.

Because conventional channel banks, such as the D4 system, have allocated fixed time slots for each channel, these systems suffer from an inefficient use of bandwidth and cannot dynamically allocate that bandwidth. For example, if one or more channels do not have any voice or data signals to transmit at a particular time, the timeslot assigned to that channel unit in the T1 frame is unused. In addition, if a particular channel has a need for more bandwidth than the allocated time slot, the TDM system does not allow that channel to request or receive any extra bandwidth.

Due to such shortcomings, a number of alternative packet-based communications systems, such as asynchronous transfer mode (ATM), X.25 protocol, and frame relay, have been developed that do not assign fixed timeslots to each channel, but dynamically allocate bandwidth according to need. These packet-based communications systems are best used for digital data, because digital data tends to be communicated in bursts. For example, a user sending a computer file that is 100 Kbytes long will need to send the entire 100 Kbytes as quickly as possible, but then will not require any more bandwidth until another transmission.

These packetized communications systems permit the total bandwidth of the communications link to be allocated in any manner depending on the need of the channels. For example, a single channel can use the entire bandwidth for several seconds because that channel has high priority digital data, such as an e-mail message or a computer file, that must be transmitted immediately. Most of the packetized communications systems provide some system for preventing any particular channel from over-using the communications link. These packetized systems, however, cannot use the hardware of an existing time division multiplexed channel bank, such as D4. Therefore, these packet-based systems require specialized hardware.

Since bandwidth allocation in a TDM system is dedicated, there is no requirement for a bandwidth allocation mechanism to ensure fair delivery of bandwidth such as is required in packet-based systems. No established mechanism exists to ensure fair delivery of bandwidth for packet-based systems using TDM based hardware. Accordingly, a need exists to provide fair, low latency, delivery of packet-based bandwidth in a TDM system.

BRIEF SUMMARY OF THE INVENTION

The present invention overcomes these problems and limitations of the prior art.

Generally, the present invention provides a mechanism for fair, low latency packet-based bandwidth delivery in a distributed control environment such as a channel bank system, additionally using a special priority scheme. The priority scheme allows priority depending on prior use to enforce fairness and other objectives.

According to the priority scheme, each user or port of the distributed control environment is assigned a priority number. Data delivery to the TDM system is regulated according to the priority number.

The priority scheme is for users who are guaranteed only a minimum traffic rate or Committed Information Rate (CIR). They are allowed to temporarily send a burst of traffic or a committed burst ($B_c$) for short intervals at a higher rate in packet-based delivery systems. The priority assigned to user traffic is based on an amount of bandwidth allocation unused by the User over a given amount of time, and a total traffic history.

The priority scheme uses a "water level" in a leaky bucket priority scheme to fairly assign priority within a high or low priority band.

A first water level in a first bucket is associated with an amount of allotted bandwidth unused by the channel unit. A second water level in a second bucket is associated with an amount of unused allotted bandwidth exceeding an overflow level of the first bucket. A third water level in a third bucket is associated with the total port bandwidth utilization history.

A high priority value is derived from the first water level, when the first water level is above zero. A medium priority value is derived from the second water level, when the first water level is zero, but the second is still above zero. A low priority value is derived from the third water level, when the water levels of both the first and second buckets are zero.

The first bucket is dimensioned as the configured committed burst capacity ($B_c$) for a given User connection. The water level in the first bucket represents the current bandwidth delivery rate for the User. If the water level is above zero, the User is sending traffic below their CIR. If the water level is zero, the User has sending traffic above their CIR. In another aspect of the invention, the total port bandwidth utilization history is preferably also accounted for, when the priority is assigned in the high band.

The second bucket represents bandwidth accumulated for the User in excess of the CIR and the committed burst bandwidth ($B_c$). Thus if a User does not use their CIR nor their committed burst bandwidth for enough time, the User will accumulate excess bandwidth credit ($B_e$), up to a configured point.

Credits are subtracted from the first or second bucket for use of bandwidth, which lowers the respective water level. The subtraction is from the first bucket, if it can afford it, or otherwise from the second.

The third bucket is associated with the total port bandwidth utilization history. It is further preferred that the total port bandwidth utilization history is differentially aged, to favor recent history over older history, and optionally further compensated to favor long quiet times.

In all cases, the actual priority value is determined by a discrete mapping of the water level onto a range of high priority values in the high priority band. The water level is mapped also as a function of the total bucket capacity.

An advantage of the invention is that all users can receive the highest priority level for their traffic bandwidth allocation regardless of their preallocated bandwidth setting. It also means that all users will be throttled to the same percentage of their CIR when congestion occurs.

Since the packetized data is not assigned any particular time slot, the bandwidth that is otherwise wasted by TDM communication systems with fixed timeslots is reduced or eliminated.

The foregoing and other objects, features and advantages of the invention will become more readily apparent from the following detailed description of a preferred embodiment which proceeds with reference to the drawings.

BRIEF DESCRIPTION OF THE DRAWINGS

FIG. 4 is a schematic showing a format of the signals generated by the system for communicating packetized data over a channel bank in accordance with the invention.

FIG. 5 is a schematic diagram of a system for communicating packetized data over a channel bank in accordance with the invention.

FIGS. 15, 16, and 17 are tables showing mappings according to the preferred scheme of the invention.

DETAILED DESCRIPTION OF THE PREFERRED EMBODIMENT(S)

As has been mentioned, the present invention provides a system for transmitting packetized data of a distributed control environment such as a channel bank, which reduces or eliminates this wasted bandwidth.

The invention is particularly applicable to a system and method for communicating packetized data over a D4 channel bank and a TDM system. It is in this context that the invention will be described. It will be appreciated, however, that the system and method of the invention has greater utility, i.e., over other distributed control systems.

Figure 1:
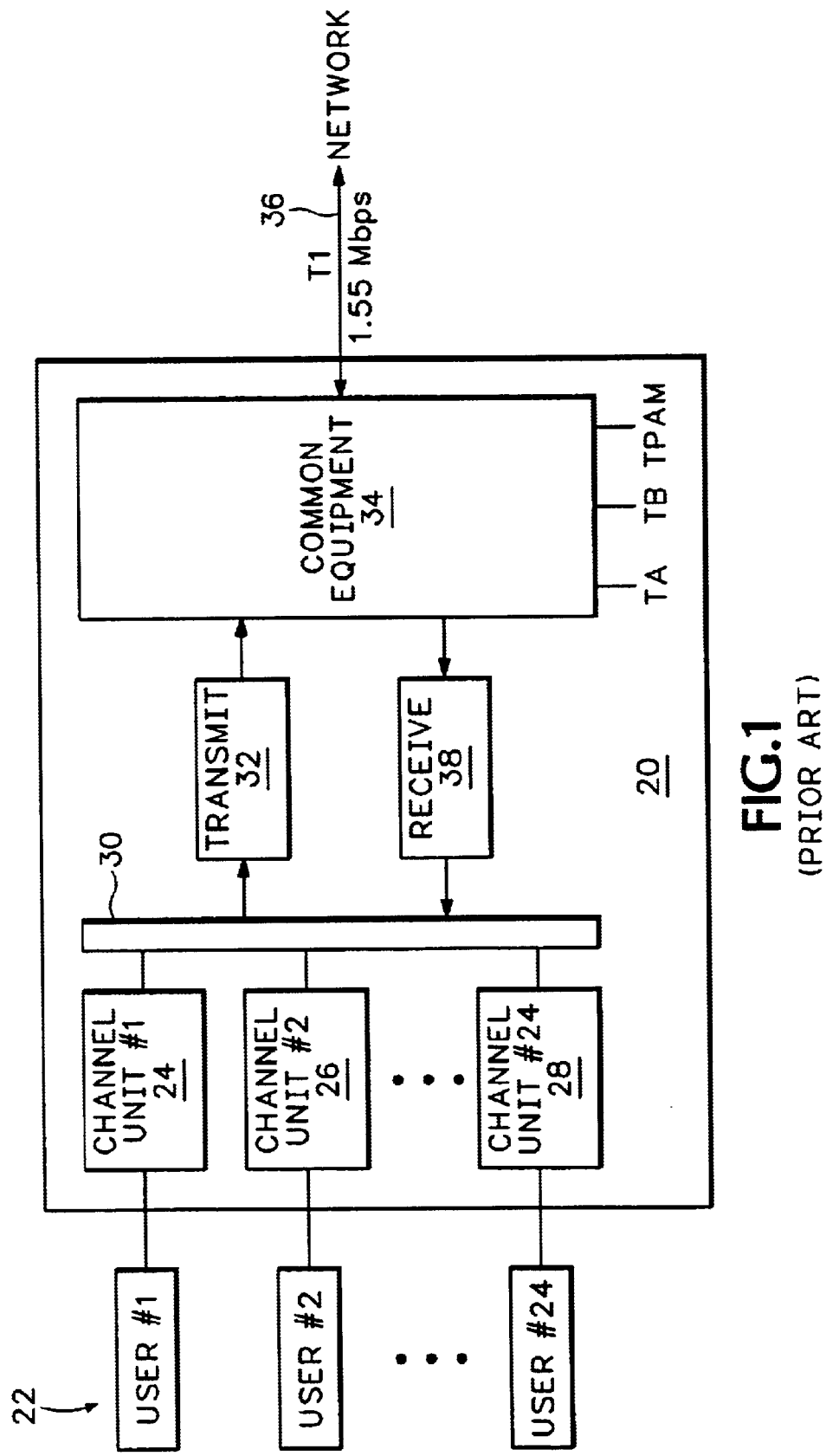
FIG. 1 is a block diagram of a conventional time division multiplexed (TDM) communications system having a channel bank.
Figure 2:
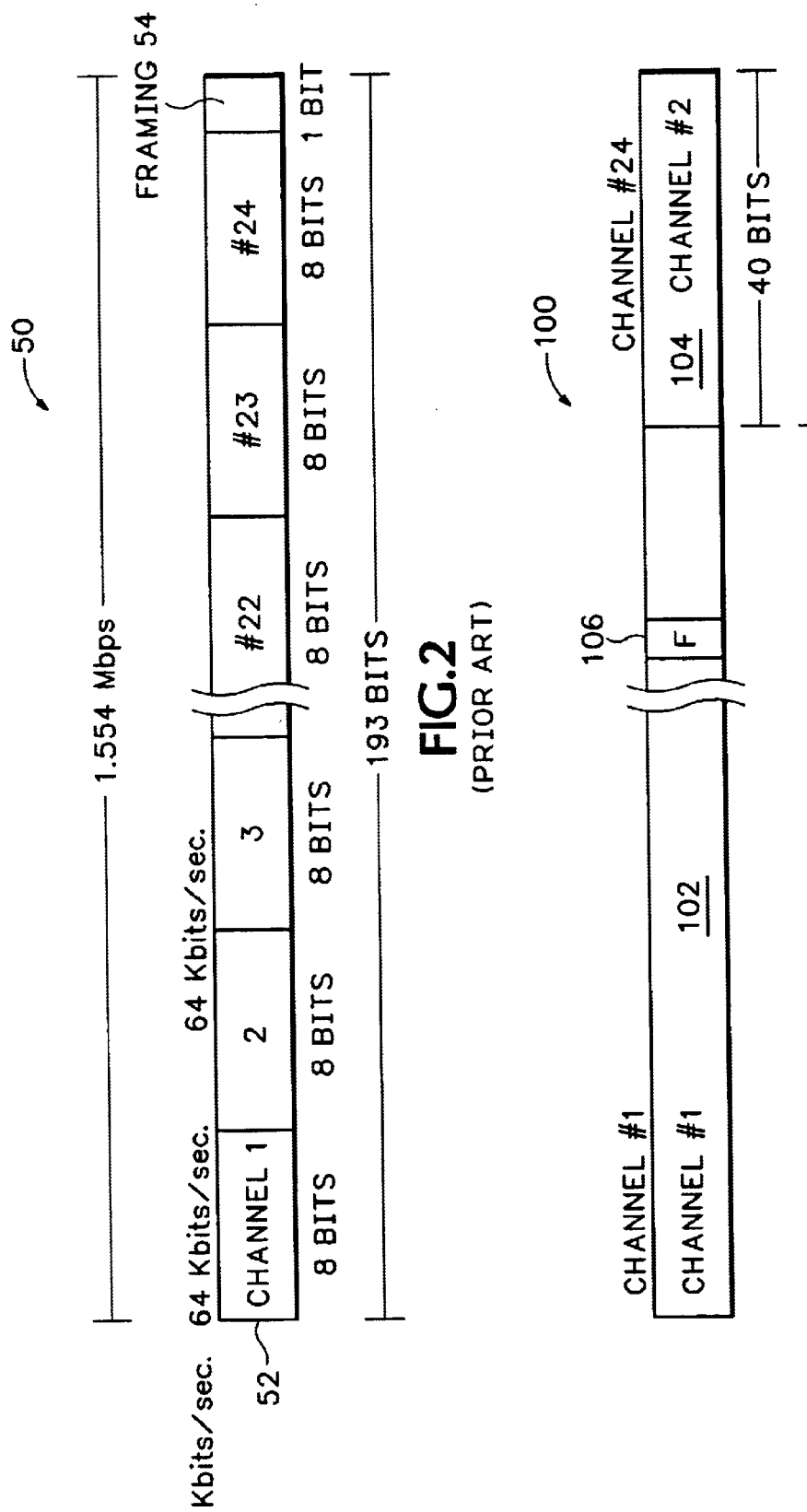
FIG. 2 is a diagrammatic view showing the format of a time division multiplexed signal generated by the conventional TDM system of FIG. 1.
Figure 3:
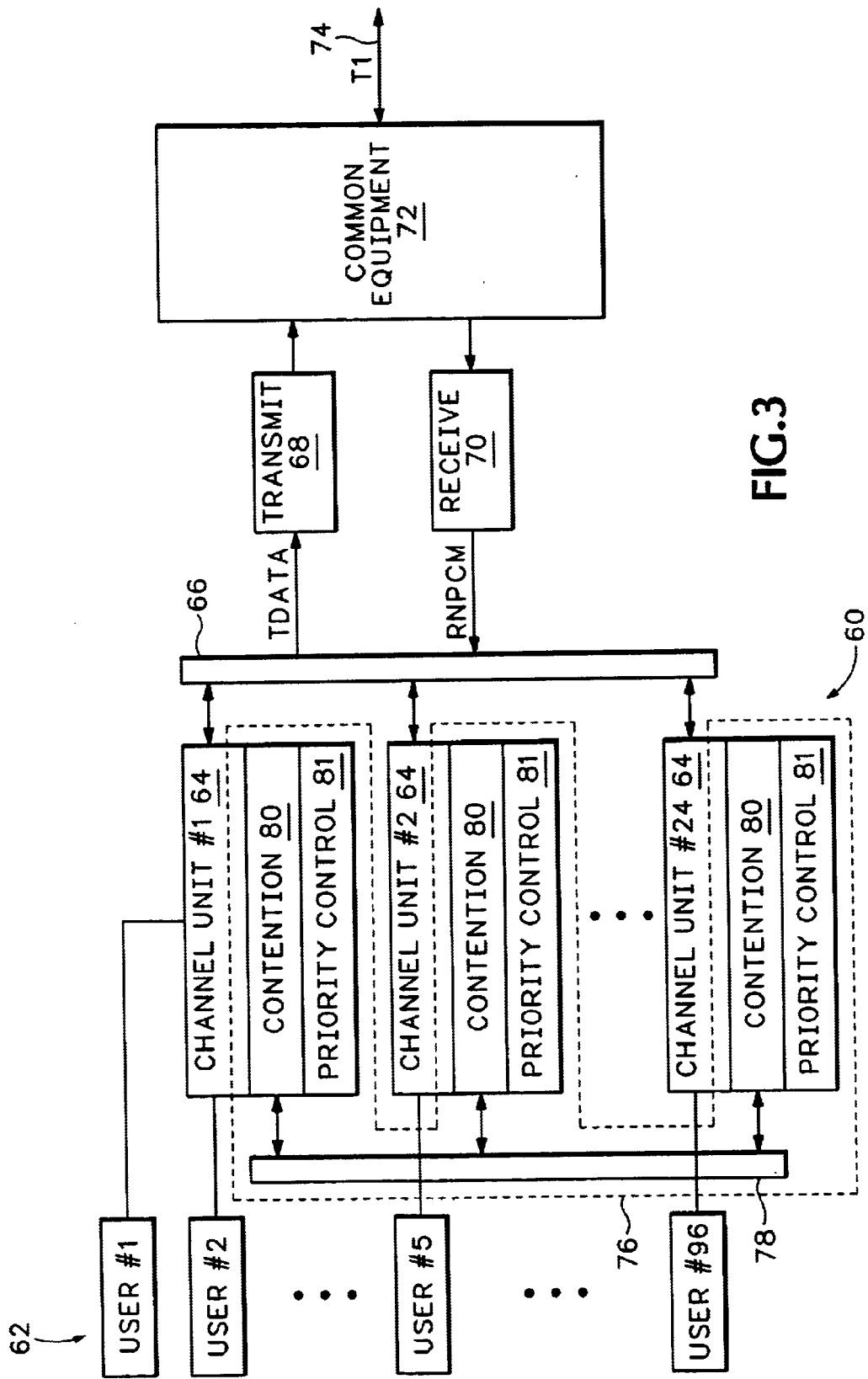
FIG. 3 is a block diagram of a system for communicating packetized data in accordance with the invention that can use an existing channel bank.

FIG. 3 is a block diagram of a system for communicating packetized data over a channel bank in accordance with the invention. A channel bank 60 can have a similar structure to the channel bank described above, including a plurality of users 62 connected to a plurality of channel units 64, a backplane bus 66, a transmit unit 68, a receive unit 70, and common equipment 72 attached to a T1 communications link 74. Each of these systems operates in a similar manner to the systems in the channel banks described above.

A particularly advantageous feature of the invention is that it can use an existing TDM communication system with a TDM scheme. The channel bank 60 shown also has a system 76 for communicating packetized data over the TDM communication system in accordance with the invention, in which each channel unit can contend for access to send packetized data over the T1 communications link. According to the TDM scheme, the common equipment still attempts to assign a fixed timeslot to each channel unit by sending addressing signals as described above. However, each channel unit ignores those addressing leads and sends packetized data over the T1 link using a channel bank. When a framing bit of the T1 link occurs during the transmission or reception of packetized data, the framing bit of the T1 link is skipped. Accordingly, the channel bank sees the framing bit and believes that it is still communicating time division multiplexed data even when packetized data, in accordance with the invention is being communicated.

Since there are not any fixed time slots in a packetized data communications system, there needs to be some system for determining which of the channel units gains access to the bus. Without some contention or arbitration system, each of the channel units can try to send data at the same time. Therefore, a contention system determines, based on some criteria, which of the channel units is going to send data next over the communications link. A contention system in accordance with the invention will be described below.

The system for communicating packetized data over the TDM communication system can include a contention bus 78 that can be connected to a contention system 80 located within each of the channel units 64. In the channel bank 60 that communicates packetized data, the TA, TB and TPAM buses of the D4 system, as described above, are used only for voice signals and voice signaling information, and not needed for the packetized data communication system in accordance with the invention. This is because the packetized data is digital, and there is no telephone signaling information. Therefore, any one or more of these existing buses can be used for the contention bus 78 in accordance with the invention. In the examples shown below, the TB bus can be utilized as the contention bus. As shown, the contention bus can be connected to each channel.

In addition, each channel has a contention system 80 physically located within each channel unit 64. Unlike most conventional packetized communications systems that have a centralized processor that handles priority and contention issues, the contention system of the invention is a distributed contention system that is spread over each channel unit and uses existing buses. A TDATA bus can communicate data between the backplane bus and the common equipment.

The system of the invention allows a D4 channel bank to multiplex multiple customers onto a T1 link using a packetized data protocol, such as frame relay protocol, instead of the TDM format described above. One of the advantages of the bus architecture of D4 is that, except for the addressing signals TSP/TSQ/RSP/RSQ, all of the 24 channel units are on the same bus. Therefore, for transmitting packetized data, such as frame relay data, one can ignore the addressing leads and treat the TDATA and RNPCM buses as unformatted data busses, so that all channel units can send and receive data packets over these data buses. To accomplish this, however, the framing bit 54 must be maintained. The transmit unit 68 and the receive unit 70 still need to use this bit so the channel unit needs to identify it so as to avoid using it. Each channel unit does this by counting the number of TDCLK counts between successive occurrences of TWD for the transmit direction, and also the number of RCLK counts between successive occurrences of RWD in the receive direction. Since TWD and RWD occur every timeslot, there are normally 8 clocks between successive occurrences. During the framing bit, however, there will be 9 clocks between occurrences. This difference allows us to determine where the receive and transmit framing bits are located, and avoid overwriting them with packetized data. Some other implementations of the transmit unit 68 remove the clock edge during the transmit framing bit. In this case all of the occurrences in the transmit direction will be 8 bits, but it doesn't matter since the lack of a clock will automatically prevent us from using the transmit framing bit.

In the receive operation, once the receive framing bit has been identified, all of the channel units in the channel bank look for frames addressed to themselves on RNPCM. To identify frames of data, these frames can start anywhere, and have no relationship to the T1 framing bit (which makes it necessary to have some protocol to address the frames). The frame relay protocol has a 10-bit address, called the DLCI, at the start of each frame that is usually used to identify one of 1024 sub-channels of a single user. For the system in accordance with the invention, the most significant 5 bits of the DLCI can be used to identify to or from which of the 24 channel units the frame is addressed. Since there are only 24 channel units, the values 0 and 25 to 31 are not used for normal addressing, and can be used for other purposes such as network management. In the implementation of the invention, these DLCIs can be treated as broadcast signals so that all channel units receive them. Each channel unit buffers all the frames it sees on RNPCM where the most significant 5 bits of the DLCI match its slot number is 0 or 25 to 31. Inside each channel unit, the next 2 bits of the DLCI are used to identify which of the 4 customers attached to that channel unit is to receive the frame. The remaining 3 bits of the DLCI can be given to the customer to identify up to 8 sub-channels, if desired. Therefore, each frame of packetized data has an address, such as the DLCI for frame relay data, located at the beginning of the frame.

In the transmit direction, the use of an addressing protocol, such as the DLCI, to identify the channel unit, customer, and sub-channel the frame is coming from is the same as in the receive direction. The transmission of packetized data over a channel bank is more complicated, because only one channel unit can transmit at any given time. Therefore, a mechanism, such as the contention system 76, must be present to determine which channel unit gets to send data at any given time. A problem, however, is that there are no spare data busses on the D4 backplane, to allow the channel units to communicate with each other and to negotiate. The system in accordance with the invention solves this problem by recognizing that any TDM based voice channel units will never be plugged into the same channel bank with the channel units 64, since these voice channel units require TDM operation. Therefore, the TNEN bus will never indicate an analog signal, and the transmit unit 68 will never need to use TA, TB, or TPAM. Therefore, the system in accordance with the invention can use these busses to allow the channel units 64 to communicate and determine which user gets control of the TDATA bus, and which channel unit can send a frame of packetized data. In the preferred embodiment only the TB bus is used, however any of the buses or a combination of the buses can be used to communicate between the channel units.

In order to insure that multiple customers receive approximately equal access to transmit packetized data, and that no customer over-uses the system of the invention, a limit is desirable on the amount of packetized data that each customer has recently sent during a time interval. The amount of packetized data can be limited to a predetermined number of frames of packetized data, a predetermined number of bytes of packetized data, or a combination of both. Each customer can be limited to a given amount of packetized data that can be sent during the time interval.

All these issues are addressed by introducing the concept of priority. Packetized data for each customer can be assigned a 5 bit dynamically changing priority, as described below in more detail. The instantaneous value for the priority is based on how much a particular customer is above or below his allocation. Highest priority can be given to customers that are well below their allocation, middle values of priority can be for customers that are just using their allocation, and increasing lower priority can be given to customers that are well above their allocation. This is a type of negative feedback, since a user's sending packetized data decreases his priority, which in turn, gives other customers a chance to send data. Once a channel unit has had a chance to send data at a given priority level, it cannot send data again at that priority level during the time interval, until all other cards that have packetized data at that priority level have had a chance to send a frame of packetized data at that priority level. In addition, if all channel unit with packetized data at that priority level have exceeded their limits during the time interval, then the limits for all of the channel units are reset for that priority.

The contention mechanism is a method of implementing the priority. The mechanism can have a plurality of contention periods during each T1 frame as described below. The actual number and location of these contention periods is not important, only that all the channel units in the channel bank know where the start of each contention period is. This is accomplished either by pre-determination or some other signaling mechanism.

Following contention, a given channel unit can be the CurrentSender or the NextSender, or both, as described below. At any given time, however, there can be only one CurrentSender and one NextSender in the channel bank. The CurrentSender is the channel unit that is currently using the TDATA bus, and the NextSender is the channel unit that has won the contention process but has not yet started sending data on TDATA.

FIG. 4 is a schematic diagram of a single T1 frame 100 containing packetized data in accordance with the invention that can be communicated over a channel back. In the example shown, a first channel unit signal 102, and a second channel unit signal 104 are shown concatenated. As described above, the timeslots in the T1 frame are ignored. Thus, the first channel unit communicates its packetized data until all of the packetized data has been communicated. In this example, the first channel unit communicates 120 bits of data during the T1 frame shown, and the second channel unit communicates only 40 bits of data during the T1 frame shown. In accordance with the invention, it can be that a single channel unit can completely use the entire 192 bits in a T1 frame for some period of time.

For transmission, once a 192-bit signal is generated, a framing bit 106 can be added to the end of the 192 bits by the common equipment, to form the appropriate length T1 frame of 193 bits. When a channel unit transmits packetized data over the channel bank, in accordance with the invention, that would overlap the framing bit position, the framing bit is skipped so that the framing bit can be added by the common equipment, and then transmission continues in the next T1 frame. Now, the detailed structure of an embodiment of a contention system will be described.

FIG. 5 is a schematic block diagram of an embodiment of the contention system 80 of FIG. 3. It should be remembered that each channel unit within the channel block has a contention system. For clarity, the description of the contention system will be only for a single channel unit, but each channel unit can have a similar system that can operate in a similar manner.

As described above, in this embodiment, a TB bus 107 can be used to communicate contention data between the channel units. The contention bus is an open collector bus that uses the TB bus in the D4 system, or one or more of the buses, TA, TB or TPAM that are normally used for voice signaling. The contention bus is pulled low by one or more of the channel units, or kept high by a resistor as described below. The other buses, TDATA 108, TDCLK 109, and TWD 110 are D4 backplane signals, which as described above, can be used by the contention system 80 to interface with the rest of the TDM communication system. In particular, the data generated by each channel unit is outputted over the TDATA bus 108, and the clock signal for the TDM system is carried over the TDCLK bus 109, so that the contention system can be synchronized with the TDM system. The signal on the TWD bus 110 can indicate the beginning of each of the twenty-four TDM timeslots.

The contention system 80 can include a frame detect unit 111 that detects the T1 framing bit, so that it can be ignored and it can be used to reset the contention system in each channel unit. To determine the beginning of each new T1 frame, the frame detect unit can be clocked by the 1.544 MHz TDM system clock signal on the TDCLK bus 109. Each clock pulse represents a single bit of the total 1.544 Mbps. The frame detect unit can also use the signal on the TWD bus 110, which goes high in the middle of each of the twenty four time slots. The frame detect unit can count the number of clock pulses on the TDCLK bus that occur between rising edges of the TWD signal. Normally, since each time slot has 8 bits, as described above, there should be 8 clock pulses between successive signals on the TWD bus. However, at the end of a T1 frame when the framing bit is added, there are nine clock pulses during the period between successive TWD pulses. When the framing detect unit detects a odd number of clock pulses during the period between successive TWD pulses, the frame detect unit can output a framing bit signal 112 that resets several counters within the contention system, that determine when contention is done.

A counter 114 divides the 1.544 MHz clock signal on the TDCLK bus by half, so that the location of the contention bits, as described below, can be properly aligned with the 1.544 MHz clock signal. An enable signal 116 can be generated by the counter which causes contention bits, as described below, to be generated on the contention bus, TB in this example, beginning at the falling edge of the enable signal 116. A second counter 118 can be clocked by the clock signal, and can count 24 bits of each contention period. In this embodiment, the 192-bit signal can be divided into four contention periods, each of which is twenty-four bits long, but operates at half the clock speed to provide sufficient time for the contention process. The invention, however, is not limited to any particular number of contention periods.

The second counter 118 can be enabled by the enable signal 116, and reset at the end of each 193-bit T1 frame by the framing bit signal 112. The second counter can output a count value 120 that can be 5 bits, and can determine which contention bit is being output by each contention system in each channel unit, as described in more detail below. The 5-bit count value can cycle from 1 to 24, in this embodiment, four times during each 193-bit TDM frame. This count value clocks the four 24-bit contention periods. The 5-bit count value can be fed into a contention logic 122 whose operation and detailed structure will be described below with reference to FIG. 6. Briefly, the contention logic contends with other contention logic in each channel unit to determine which channel unit will get access to the TDATA bus by using the TB bus 107 to communicate the contention bits. When a particular channel unit has been selected by the contention systems in the channel units, as the CurrentSender of data, as described below, the contention logic of that channel unit raises a CurrentSender signal 124 high so that the channel unit can communicate data over the TDATA bus 108. The CurrentSender signal can be used to control a HDLC controller 126.

The HDLC controller is well known in the art, and can generate HDLC frames that are going to be communicated over the TDATA bus 108. The HDLC frames can be a series of data bits separated by flag bits. The flag bits can be represented by the bit sequence "01111110" which can be used to separate frames of packetized data, and can also be used for filling in idle conditions between frames. The sequence of bits in the flag never occurs within a frame of packetized data.

The signal formatting controller can be clocked by the clock signal on the TDCLK bus 109. When the signal formatting controller has data to be sent, a Request_To_Send (RTS) signal 128 is raised high. When the RTS signal is raised high, the contention logic 122 will begin contending with the other channel units for permission to send the data over the TDATA bus, as described below in more detail. The signal formatting controller can be controlled by a Clear_To_Send signal 130, which can be low when the CurrentSender signal is low, indicating that the particular channel unit can not send data over the TDATA bus yet. The CTS signal can be generated by an AND gate 132 that prevents the CTS from going high, if the framing bit has been detected. This prevents the contention system from sending data during the framing bit.

However, when the CurrentSender signal goes high, indicating that the contention logic has won permission to send data over the TDATA bus, data can be sent out over a DataOut bus 134 that can be connected to a buffer 136. The buffer can also be controlled by the CTS signal, so that data is output from the buffer to the TDATA bus only when the CTS signal is high and is high impedance otherwise. The signal formatting controller can also have a data enable (DATAEBL) signal 138, that can be high when the controller is sending data bits and can be low when the controller is sending flag bits. This signal can indicate to the contention logic through a DataAvail input when the actual data bits, instead of flag bits, are being sent. The signal formatting controller can only send a single frame each time both the RTS and CTS signals are high.

A flag detector 140, can be clocked by the clock signal, and can monitor data output over the TDATA bus 108 by the buffer 136 and can output an EndOfFlag signal 142 during the transmission of flag bits over the TDATA bus. To detect flag bits, the flag detector detects the "01111110" bit sequence, as described above. The flag detector is enabled by an EBL signal only when the framing bit signal 112 is low, indicating that no framing bit has been detected.

The contention logic 122 can be enabled by an ENABLE signal 144 that can be generated by a NOR gate 146, and can generate an inverted version of the enable signal 116 used for the second counter 118. The enable signal has been inverted because the counter 118 can change its count at the start of each new contention bit. However, the contention logic can sample the TB bus in the middle of the contention bit time period. In order to skip the framing bit, the framing bit signal 112 is also fed into the NOR gate 146. Now, the details of an embodiment of the contention logic 122 will be described.

Figure 6:
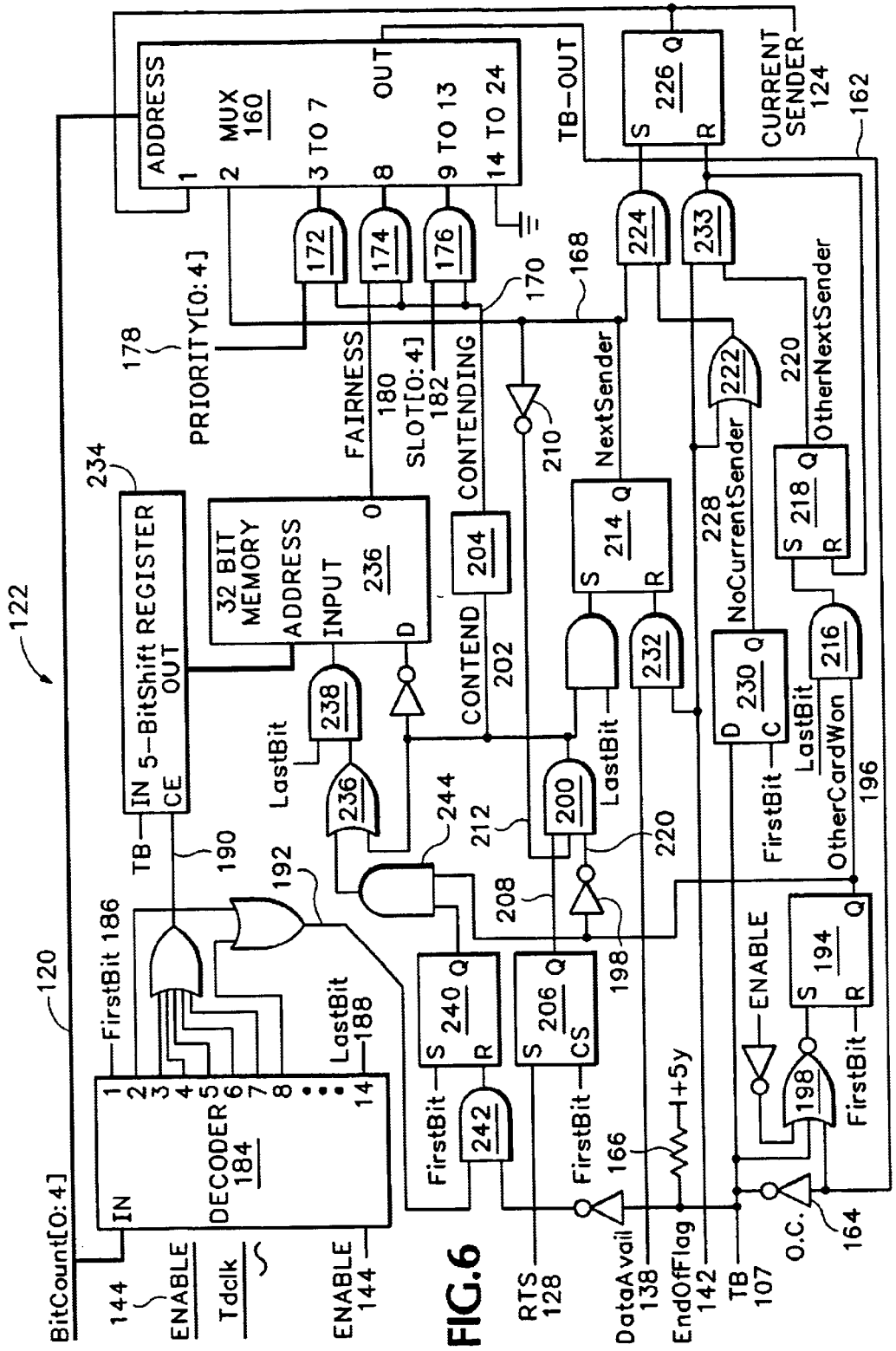
FIG. 6 is a detailed schematic diagram showing an embodiment of a contention logic of the system of FIG. 5.

FIG. 6 is a schematic diagram of an embodiment of the contention logic 122 shown in FIG. 5. Although not shown for clarity, each of the flip-flops shown in FIG. 6 can be clocked by the 1.544 MHz clock signal on the TDCLK bus. As described above, the bit count signal 120 can indicate the beginning of each of the twenty-four contention bit time periods during each contention period. A multiplexer 160 can be used to select the contention bit to be output on the TB bus 107 during each of these twenty-four contention bit time periods from a plurality of signals attached to the multiplexer. The format of the bits sent out by the contention logic over the TB bus is described in more detail below with reference to FIG. 8. The output signal from the multiplexer can be a TBOut signal 162, which can be inverted by an inverter 164, such as an open collector inverter, prior to be placed on the TB bus. The open collector inverter can only pull the TB bus low when a positive signal is generated by the multiplexer. Thus, a high signal from the multiplexer results in a low signal on the TB bus, which has advantages that are described in more detail below. If no contention system within any of the channel units in the communications system is pulling the TB bus low, then the TB bus can be kept high by a resistor 166 connected to a power supply. As described below with reference to FIG. 8, the first 13 bits of the contention period can be used, and bits 14 to 24 are unused so that the inputs 14–24 of the multiplexer are tied to ground. Briefly, each channel unit sends inverted contention bits so that a priority of four ("0100") becomes 1011 on the TB Bus. Then, each channel unit knows that it has lost the contention process if it is trying to send a "0" in a bit position (which would result in a 1 on the TB Bus) and the TB bus is a "0". The purpose of each contention bit will now be described.

During the first contention bit, the multiplexer can output a high signal representing the CurrentSender signal 124, if the particular channel unit that the multiplexer is located within currently has control of the TDATA bus and is currently sending packets of data over the communications system. During the second contention bit, the multiplexer can output a high signal based on a NextSender signal 168 if the particular channel unit has been selected to be the next sender of packetized data over the communications link. The NextSender signal can be generated by the contention logic, as described below, if the channel unit has won the contention process. During the third through thirteenth contention bits, the output of the multiplexer depends on a Contending signal 170. The details of the contending signal will be described below. When the Contending signal is high, indicating that the particular channel unit is still contending to send data during the next frame, contention bits three through thirteen can be generated. When the Contending signal is low, indicating that the channel unit has already lost the contention process for the next frame, a set of AND gates 172, 174, 176 prevent any bits from being sent by the multiplexer for contention bits three through thirteen. If the channel unit has already lost the contention process, there is no reason for the contention logic within that channel unit to continue to send contention bits. When the next contention period begins, the AND gates will be reset, so that the channel unit can again contend.

If the Contending signal 170 is high, then signals can be generated that are fed into the multiplexer, and out over the TB bus. The third through seventh contention bits can hold a value of a priority 178 of the data that the particular channel unit wants to send. The priority can be generated by software within the communication system. In the contention process, a channel unit with higher priority data will always win over a channel unit with lower priority data, so that the higher priority data will not be delayed by the communications system. During the eighth contention bit, a fairness bit 180 can be generated, as described below, and sent over the TB bus by the multiplexer. During the ninth through thirteenth contention bits, a slot signal 182, indicating which slot the particular channel unit is plugged into, can be generated and sent over the TB bus by the multiplexer. The slot signal 182 can be determined by the hardware of the channel bank, as is known in the art.

A decoder 184 can decode the count on bit-count signal 120 when the Enable signal 144, as described above, is high. The decoder outputs timing pulses for the first through eighth contention bits, and for the fourteenth contention bit, which is the first unused contention bit. For example, a FirstBit signal 186 can be output during the first half of the first contention bit, and a LastBit signal 188 can be generated during the first half of the fourteenth contention bit. A third count signal 190 can be generated during the first half of the third through seventh contention bits, and a fourth count signal 192 can be generated during the first halves of the second and eighth contention bits.

A latch 194, that can be a R-S flip-flop, can be used to generate an OtherCardWon signal 196, which indicates that some other channel unit, other than the particular one with this contention logic, has already won the contention process and will be the next sender. The flip-flop can be held reset during the first contention bit by the FirstBit signal 186 received at the reset input of the flip-flop. A logic gate 198, such as a NOR gate, can be used to set the flip-flop, if the particular channel in which the contention system is located has lost a contention bit. A particular channel can lose a contention bit when the multiplexer 160 attempts to output a low TBOut signal 162, as described below, which causes the inverter 164 to go high, but the signal on the TB bus is already low because another channel unit has pulled it low and won the contention process over the particular channel unit.

Once the particular channel unit has lost the contention process for any contention period of twenty-four bits, the OtherCardWon signal 196 goes high, and remains high until the beginning of the next contention period. This signal causes a high signal at an input of an inverter 198, and a low signal at an input of a logic gate 200, that can be an AND gate. This in turn causes a Contend signal 202 to go low. This Contend signal is delayed by a latch 204, so that the Contending signal 170 goes low a single clock cycle later. As described above, the Contending signal 170 prevents the multiplexer from generating contention bits over the TB bus for the remainder of the present contention period, if the channel unit has already lost the contention process. Now, the system for determining when the contention logic should start contending for a frame is described.

As described above, a high RTS signal 128 indicates when each contention system within each channel unit should begin contending for control of the TDATA bus. When the RTS signal goes high at the beginning of a new contention period, and the FirstBit signal 186 goes high, a latch 206 that can be a flip flop generates an output signal 208 that goes high. The output of the latch 206 can be input into the AND gate 200, described above, along with an inverted Next-Sender signal 212 that can be generated by an inverter 210. If the channel unit is not currently the next sender, then the inverted NextSender signal is low, and the AND gate 200 allows the Contend signal 202 to go high and the Contending signal 170 to go high one clock cycle later. If another channel unit has already been designated as the NextSender by the contention system, in accordance with the invention, the TB bus will be pulled low during the second contention bit, causing the OtherCardWon signal 196 to go high, and thus preventing the particular channel unit for contending on the third through thirteenth contention bits. If there is no next sender, the channel unit will continue contending for access to the TDATA bus until the contention logic loses a contention bit, as described above, and the OtherCardWon signal 196 goes high. If the particular channel unit is still contending for access (the Contend signal is high) to the TDATA bus when the fourteenth contention bit is detected, it has won the contention. In this case, a latch 214, that can be a flip flop, will be set because the LastBit signal is high, and the Contend signal is high so that the flip flop can output a 1 on the NextSender signal 168. If any other channel unit wins the contention by the fourteenth bit, when the LastBit signal goes high and the OtherCardWon signal 196 will also be high. This causes an output of a logic AND gate 216 to go high, which in turn sets a latch 218, that can be a flip flop. When the latch 218 is set, an OtherNextSender signal 220 can be generated. It should be clear that the NextSender and OtherNextSender cannot both go high, so there is only a single NextSender.

If the particular channel unit shown is the NextSender, then that channel unit will become, at the end of the current frame, the CurrentSender and will have control of the TDATA bus. The NextSender signal 168 and the output of an OR gate 222 can be ANDed by an AND gate 224, which sets a latch 226, that can be a R-S flip flop, and generates the CurrentSender signal 124 and feeds that signal into the first bit of the multiplexer. The output of the OR gate 222 can go high when a NoCurrentSender signal 228 or the EndofFlag signal 142 goes high. The NoCurrentSender signal 228 can be generated by a latch 230, that can be a flip flop, which samples the TB bus during the first contention bit (as indicated by a high FirstBit signal 186) to determine if any of the channel units pulled the TB bus low during the first contention bit. The condition of no CurrentSender will only occur if the CurrentSender was interrupted from completing its transmission (for example, being physically removed from the channel bank), which would cause the EndofFlag signal 142 to never go high. Thus, determining if there is a CurrentSender at the beginning of each contention period prevents this lock-up from occurring.

Once the channel unit has become the CurrentSender, it can also remain the NextSender if the DataAvail signal 138 is low, in order to prevent another channel unit from becoming the NextSender and then trying to become the CurrentSender. If this were allowed, it would cause a conflict. To release the NextSender signal, the DataAvail signal 138 goes high, as described above, which causes the output of an AND gate 232 to go high which resets the latch 214. This causes, the NextSender signal to go low, and another channel unit can become the NextSender.

Once the channel unit releases the NextSender signal, all of the other channel units within the communications system can again contend to be the NextSender, which causes the OtherNextSender signal to go high. If the channel unit has completed sending its packets of data, then the EndofFlag signal 142 goes high, and the NextSender becomes the CurrentSender. If there is no NextSender, then the channel unit shown will continue to be the CurrentSender and send flags until a NextSender is selected.

Now, the priority system and the fairness bit determining system will be described. As described above, during the third through seventh contention bits, the priority of the data that each channel unit wants to send is sent over the TB bus. During any contention period as a winning priority is determined, it can be clocked into a shift register 234. The shift register then outputs a signal that causes a memory 236 to output a fairness bit for the winning priority as a Fairness signal 180. This fairness bit prevents a channel unit that has sent data at the winning priority level from becoming the NextSender again for that winning priority level, until all of the other channel units with the same priority data have had a chance to control the TDATA bus and send packetized data over the communications link. If the channel unit shown wins the contention and will become the NextSender, as described above, the Contend signal 202 will be high when the LastBit signal 180 is high, so that an OR gate 236 can output a high signal, and the output of an AND gate 238 connected to the LastBit signal and the Contend signal will go high, which causes a write pulse to be input to the memory 236. The write pulse causes a "0" to be written into the memory, resetting the fairness bit for the shown channel unit, and making it harder for the shown channel unit to win the contention again at the same priority level, until all of the other channel units have had a chance to send data at that priority level during the time interval, as described above. The fairness bit can be reset to "1" if any other channel unit wins the contention process with a fairness bit set to "0". This will only happen if all cards that were contending at that priority level already have their fairness bits sent to 0.

If some other channel unit won the contention at a particular priority level with a fairness bit set to "0", then the shown channel unit wants to reset its fairness bit for that particular priority level to "1", so that the shown channel unit can have a better chance to win the contention process the next time at that priority level. To accomplish this, a latch 240, that can be a flip flop, can be initially set by the FirstBit signal 186. An AND gate 242 resets the latch 240 when the signal 192, during the second or eighth contention bits, is high and the TB bus signal is low. A low TB bus signal during the second contention bit indicates that a NextSender has been selected, and a low TB bus signal during the eighth contention bit indicates that the NextSender had a fairness bit for its particular priority of "1". Thus, latch 240 will only remain set if there is no NextSender and the fairness bit of the card that will become the new NextSender was "0". If the output of latch 240 goes high and the OtherCardWon signal 196 is high, then the output of an AND gate 244 can also go high. If these conditions occur, then the channel unit shown wants to set its fairness bit for that particular priority to "1", so that it will have a better opportunity to gain access to the TDATA bus for that particular priority level data, before any other channel unit that has already sent data at that priority level.

Figure 7:
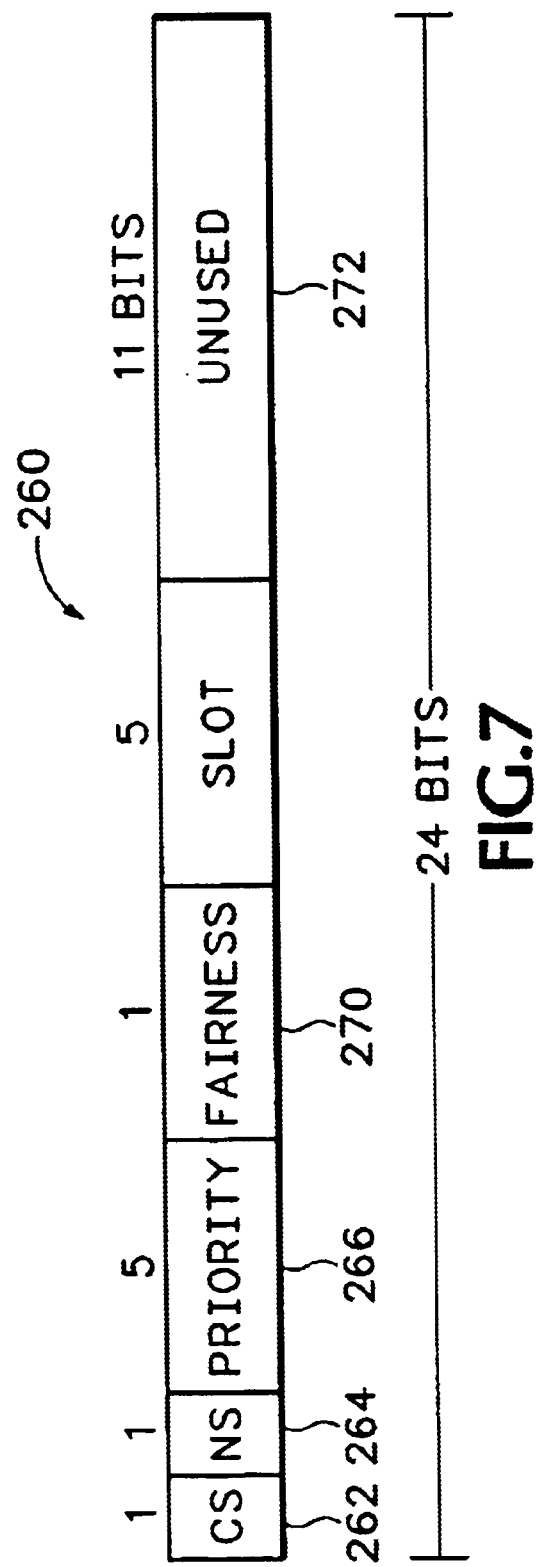
FIG. 7 is a diagram showing a format of the contention bits on a contention bus in accordance with the invention.

Referring to FIG. 7, the format of the contention bits and the contention process will be described in more detail. FIG. 7 is a diagram showing a 24-bit contention signal 260 in accordance with the invention. As described above, each channel unit generates each one of the contention bits until that channel unit has lost the contention process. The contention bits are compared starting at a first bit. As shown, the contention signal can have a number of individual contention bits that are separately generated, and output over the contention bus as described above. A first contention bit 262 is a CurrentSender (CS) bit. As described above, the multiplexer in the contention logic of FIG. 6 outputs a high "1" signal when, for example, a particular channel unit is sending data, but the signal can be inverted so that a "0" can be actually output over the TB bus. In this description, the output over the TB bus will be described. Therefore, the CS bit can usually be "0", indicating that a channel unit is already currently sending packets of data. As described above, this CS bit can be ignored for purposes of determining which channel unit will be the NextSender. However, it can be monitored by a current NextSender to determine when the CurrentSender has finished sending data, or to immediately transfer control of the bus to the NextSender, if the CurrentSender is interrupted in its transmission of data.

A second contention bit 264 (NS) indicates whether a particular channel unit has already won the contention, and has thus become the next channel unit to send data. If the NS bit is "0", then there is a channel unit already waiting to send data, and this channel unit will win any contention process until it can send its data. This is because the NS bit is the second contention bit, and the NS contention bit is the first contention bit that is compared. As described above, this ensures that the channel unit that is waiting to send data does not have its access to the TDATA bus stolen by another channel unit, until that channel unit has sent its packetized data. If the NS bit is "1", then the next channel unit to send data has not been determined, and each channel unit can compete using the third through thirteenth contention bits. These contention bits are priority bits (bits 3–7), a fairness bit (bit 8), and a slot address (bits 9–13). A set of priority bits 266, which can be 5 bits long, can be set by the communication software or hardware, depending on the amount of data packets allocated to each channel unit and the current number of data packets sent by the channel unit compared to the allocation. The priority bits are sent such that the most significant bit is sent first. With a 5-bit signal, thirty-two priority levels are available. Assuming that the NS bit is "1", then the channel unit with the highest priority will win the contention process.

A fairness bit 268 can be generated by the contention logic, and can be used to determine which channel unit becomes the next sender when the channel units have the same priority data. If the fairness bit of a particular channel unit for a particular priority is "0", then that particular channel unit has not sent data at that priority level. If the fairness bit is "1", then the particular channel unit has already sent data at that priority level, and can not send data again at that priority level until all of the other cards with packetized data waiting to be sent at that priority have had a chance to do so. The fairness bit prevents a single channel unit from monopolizing the bandwidth of the communications systems, and thus enforces a round-robin approach. If the two channel units have different priorities, then the fairness bit is not used.

Finally, a set of slot bits 270, indicate the physical location of each channel unit within the communications system. If all of the other contention bits for all of the channel units are the same, then the channel unit with the highest slot address will become the next channel unit to send data. A set of unused bits 272 complete the 24-bit contention signal. The CurrentSender must monitor the contention bus to determine if a NextSender has been determined. If bits 2–13 of a contention period are "1", no NextSender has been determined and the CurrentSender sends flags, as described above, until a NextSender has been determined. Thus, the CurrentSender holds the data bus until a NextSender has been determined.

The contention process is now described.

Figure 8:
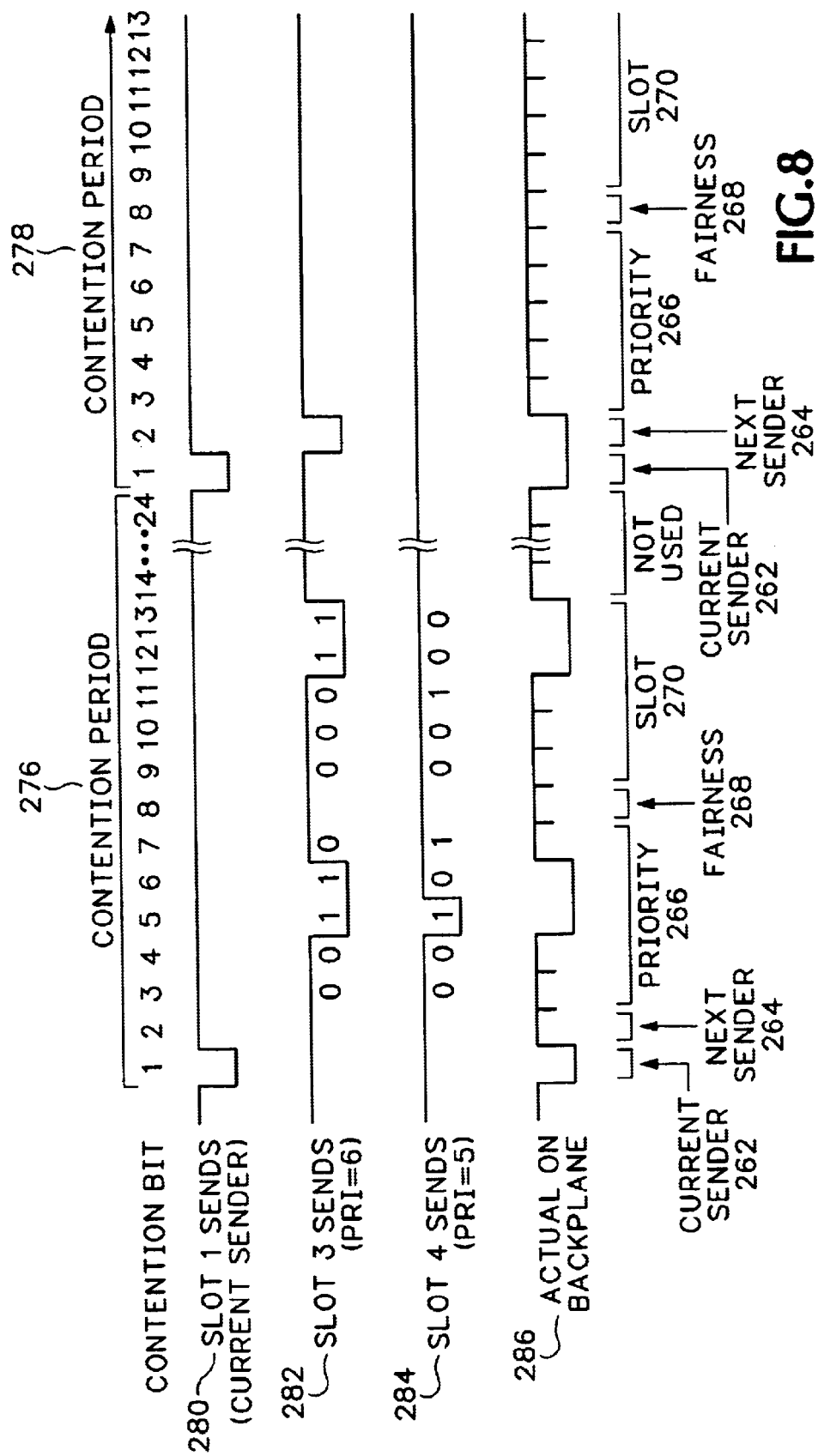
FIG. 8 is a timing diagram showing an example of a contention process in accordance with the invention between channels having different priorities.

FIG. 8 is a timing diagram showing an example of the contention process between three channel units having different priorities. As shown, a first contention period 276 and a second contention period 278, each being 24 bits long, are shown. A signal 280 for a channel unit in slot 1, which is the lowest slot address, a signal 282 for a channel unit in slot 3, a signal 284 for a channel unit in slot 4, and a resultant signal 286 on the contention bus are shown. As described above, each channel unit compares its contention bits with the contention bus to determine whether it has won the contention. In this example, channel unit in slot 1 is the CurrentSender of data, so that the CS bit is low and the resultant signal on the contention bus is also low for both of the contention periods shown. This channel unit does not contend to be the next sender of data, in this example, because it has no additional data to send.

In the first contention period 276, the NS bit 264 generated by the channel units in the third and fourth slots are both high, indicating that a next sender of data has not been chosen yet, so the contention process continues. Next, the channel units generate the priority bits 266. In this example, the channel unit in the third slot has a priority of six, which is 00110 in binary. This signal is inverted so that the output signal is 11001. Similarly, the channel unit in the fourth slot has a priority of five, which is 00101 in binary and inverted to be 11010. When these two priority bits are compared, the channel unit in slot three wins, because it has the higher priority, which is reflected by the signal 186 on the contention bus having the same result. Therefore, the rest of the contention bits from the channel unit in the third slot will be transferred to the contention bus, as shown.

During the second contention period 278, the channel unit in the third slot has won the previous contention process, but has not yet sent any data. Therefore, its NS bit is low, which also pulls the contention bus low. Thus, during the second contention period, no contention occurs because the third slot channel unit has already won the contention process, but is still waiting to send its data.

Now, a contention process is described, in which the channel units have the same priority, and the same fairness bits.

Figure 9:
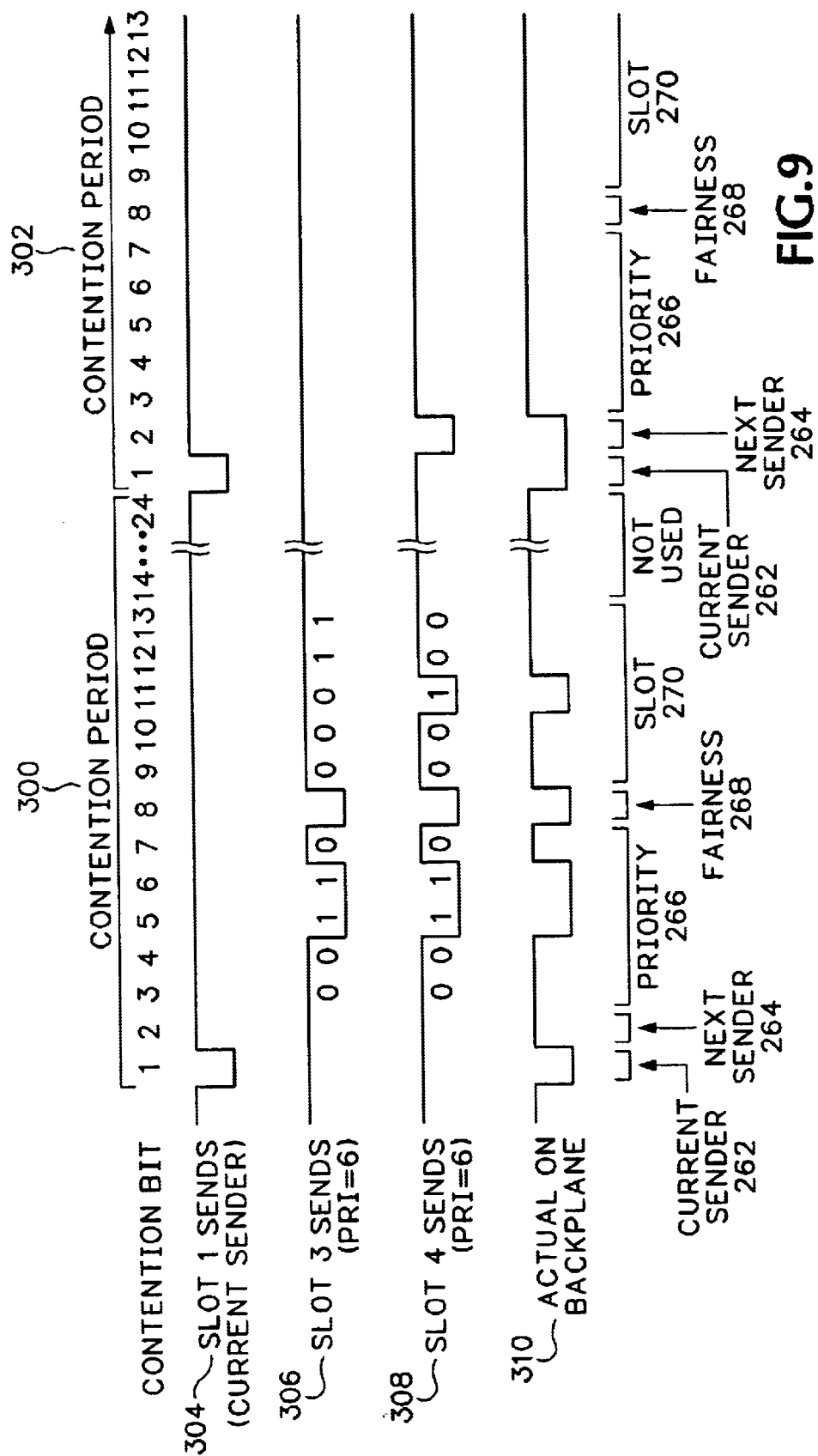
FIG. 9 is a timing diagram showing an example of a contention process in accordance with the invention between channels have the same priorities and the same fairness bits.

FIG. 9 is a timing diagram showing an example of the contention process between three channel units having the same priorities, but different fairness bits. As shown, a first contention period 300 and a second contention period 302, each being 24 bits long, are shown. A signal 304 for a channel unit in slot 1, which is the lowest slot address, a signal 306 for a channel unit in slot 3, a signal 308 for a channel unit in slot 4, and a resultant signal 310 on the contention bus are shown. In this example, channel unit in slot 1 is the CurrentSender of data, so that the CS bit 262 is low and the resultant signal on the contention bus is also low, for both of the contention periods shown. As also in the above example, this channel unit does not contend to be the next sender of data, in this example, because it has no additional data to send.

In the first contention period 300, the NS bit 264 generated by the channel units in the third and fourth slots are both high, indicating that a next sender of data has not been chosen yet, so the contention process continues. Next, the channel units generate the priority bits 266. In this example, each channel unit has a priority of six, which is 00110 in binary. This signal is inverted so that the output signal is 11001. In this example, both of the channel units have the same priority, so the contention process continues to a next step.

Next, the channel units generate a fairness bit 268. In this example, the channel units in both slots have a fairness bit of "0", indicating that neither channel unit has sent data with a priority of six before. Since these signal are the same, the contention process continues, and the resultant signal 310 on the contention bus is the same as the contention bits for all of the channel units. Next, each channel unit generates its slot number, which is 00011 for slot three, and 00100 for slot four. As above, these signals are inverted and the channel unit is slot four wins the contention, because that channel unit has a higher slot number.

During the second contention period 302, the channel unit in the fourth slot has won the previous contention process due to its higher slot number, but has not yet sent any data. Therefore, its NS bit is low which also pulls the contention bus low. Thus, during the second contention period, no contention occurs because the fourth slot channel unit has already won the contention process, but is still waiting to send its data.

If two contending channel units have the same priority, but different fairness bits, then the channel unit with the "0" fairness bit will win the contention period. The fairness bit provides a round robin mechanism, in which a channel unit that has sent data at a particular priority level can not send data again at that priority level until all of the other channel units within the communication systems have sent data at the particular priority level only if there is pending packetized data to be sent at that priority level. For example, if a channel unit is a CurrentSender, has a fairness bit set to "0", finishes sending its data, but has other packetized data at a particular priority level to send, then that channel unit can send the other data at the particular priority level, provided that no other channel unit currently has packetized data waiting to send at the particular priority level.

Priority Scheme

The priority scheme of the present invention is now presented in a summary form. Basically, in parallel with transmitting data and all the other functions described above, the invention tracks, for each port, a credit for bandwidth that is allocated but not used. This amount of credit is used to determine the next priority for the port. The less bandwidth that is used, the higher the credit, and thus the higher the priority of the port for the next transmission. In addition, the invention also tracks a history of the total transmitted volume (and adjusts it for age). The more data that has been transmitted recently, the lower the priority will be.

Figure 10:
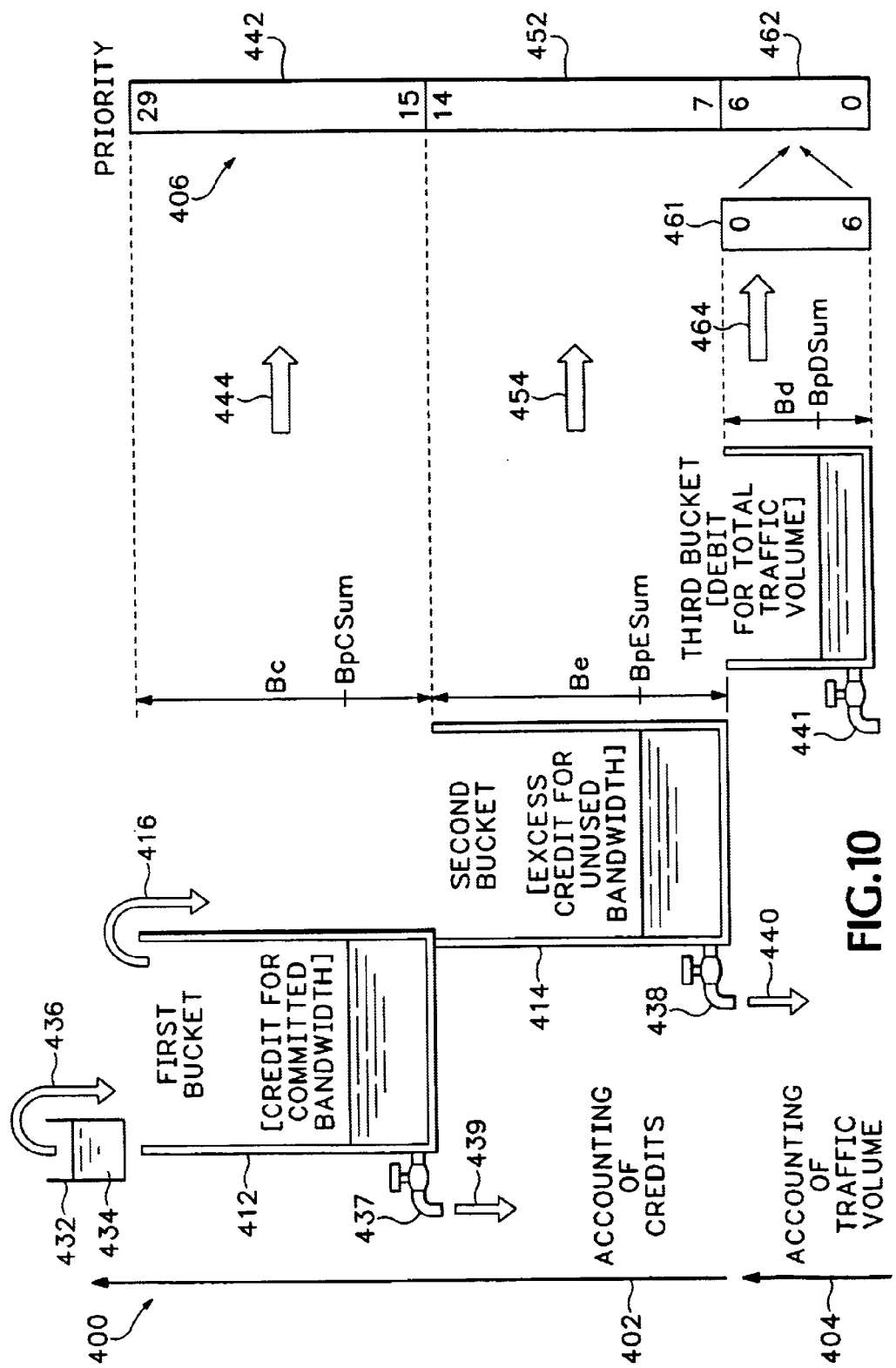
FIG. 10 is a schematic diagram of how a three bucket system is used to assign priority in three separate priority bands according to the invention.

Referring to FIG. 10, an embodiment of the priority scheme 400 of the invention is now described pictorially, to facilitate comprehension. There are two components for quantifying the priority. One is maintaining a number of credits that track unused allocated bandwidth, according to axis 402. The other tracks the history of the total traffic volume, according to axis 404. They ultimately result in allocating priority according to a totem pole 406.

For both components, an analogy is used to visualize the amount of credit. The analogy includes buckets and water in the buckets. The amount of water, a.k.a. the waterline, is used to represent this credit.

Maintenance (accounting) of the amount of credits for unused bandwidth is shown on the right side of axis 402. A dual bucket system includes a first bucket 412 and a second bucket 414. These buckets hold credits for unused bandwidth, and are also called credit buckets. If the first bucket is ever full, it overflows into the second according to overflow arrow 416.

Tracking the total traffic volume is shown on the right side of axis 404. A third bucket 422 holds debits for total transmitted traffic volume. In this analogy, the third bucket does not communicate with the other two, and does not exchange water with them.

Figure 11:
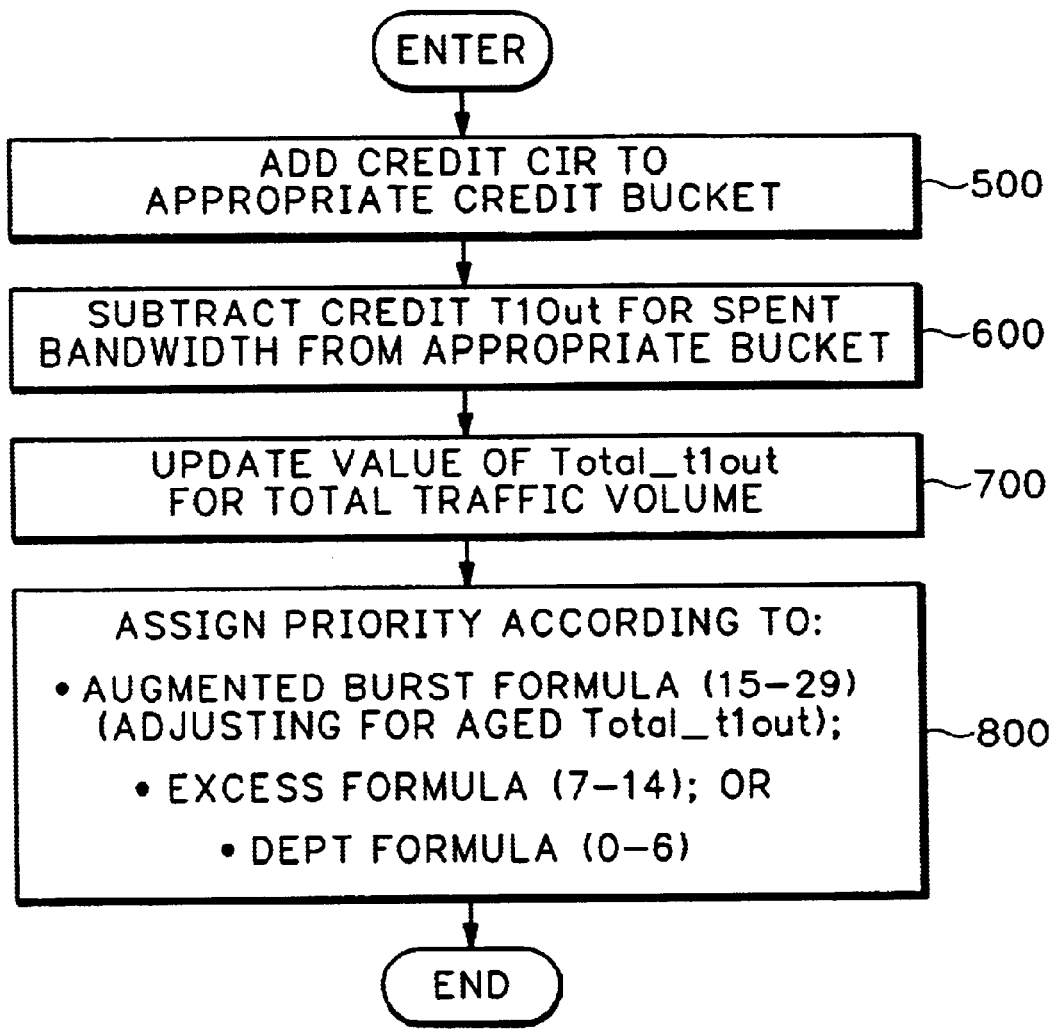
FIG. 11 is a flow chart showing how the priority scheme in FIG. 10 operates.

A general method of the invention is now described for updating priority with reference to FIG. 11, and with the concepts introduced above. The person skilled in the art will discern that many variations are possible.

The whole process of FIG. 11 is repeated at a predetermined periodic interval, e.g. in cycles of every $1/64^{th}$ of a second. The process updates the priorities of the ports relative to each other. Ports referred to below are shown in FIG. 3 as users 62.

Referring to FIG. 11, according to a first step 500, a credit is added to the appropriate credit bucket of FIG. 10. Specifically, a glass 432 is provided. Water is put into the glass to represent an amount of CIR quanta 434, i.e. the amount of bandwidth committed by the CIR to be available to the User 62 (FIG.3) for the evaluation time interval.

The glass is emptied into first bucket 412 according to the direction of arrow 436. If, as a result of this pouring, the first bucket overflows, then the quanta 434 is poured into the second bucket. If that overflows, the rest is lost. The credit thus ends up being added to the appropriate bucket.

According to a second step 600 of the invention, credit is then subtracted to account for bandwidth that was actually used. This is through taps 437 and 438 in the first and second buckets, according to arrows 439 and 440, respectively. Only one bucket is emptied, as is described below in more detail.

Steps 500 and 600 have accumulated into the combination of these two buckets (or taken from it) a net amount of water that corresponds to the net credit (or loss) for unused (or overused) bandwidth.

According to a third step 700 of the invention, the amount of total traffic volume is updated. The waterline is thus adjusted in third bucket 422 of FIG. 10, by adding the right amount. In addition, the whole amount or the preexisting amount can be aged, as is described below. Aging gives diminishing importance to older history, and is represented by operating tap 441. Alternately, adding can be with compensation, and in a way that involves aging, as is preferred.

According to a fourth step 800 of the invention, priority is allocated. Allocation is by correspondences, as is explained below.

Referring back to FIG. 10, the total available range of priority numbers (0–29) is divided into three bands. The three bands are seen as stacked to form a totem pole 406.

If first bucket 412 has any water, priority is assigned in a first high priority band 442 according to a first correspondence 444. The higher the water level, the higher the priority within the band.

If first bucket 412 has no water, then the second bucket is examined. If the second bucket has any water, priority is assigned in a second medium priority band 452 according to a second correspondence 454. Again, the higher the water level, the higher the priority within the band.

If both credit buckets are empty, then priority is assigned in a low priority band 461 according to a third correspondence 464. Contrary to the other two analogies, however, the higher the water level is in the third bucket, the lower the priority will be within band 461. That is because, to maintain the analogy of buckets and waterlines, the more water in the third bucket, the more traffic has been transmitted recently, and thus the lower the priority within the band. That is why priority band 461 is also recast in its inverted form as band 462, which completes totem pole 406, along with bands 452 and 442.

The specific priority value ranges (0–6 in the low band, 7–14 in the medium band and 15–29 in the high band) are only significant with respect to a specific hardware implementation of the channel bank 60 in FIG. 3. The specific priority value ranges described are for illustrative purposes, and can be varied according to the specific system implementation.

For all three correspondences, the actual priority value is derived by a mapping function that maps a representation of the water level, and produces a result value that is a discrete priority value. More specifically, the mapping function produces an index of an array of discrete priority values. The contents of the arrays provide the actual priority values delivered to the hardware. The array contents can be set to any priority value at any position, thus allowing complete freedom to adjust the priority of a port at any bandwidth request rate.

The priority value determined for a User is used by the contention hardware described above, for determining which port gains access to the backplane 66 (FIG. 3). Memory in a priority controller 81 (FIG. 3) stores the values associated with buckets 412 414 and 422. A processor in each priority controller 81 (FIG. 3) maintains the water levels in the buckets, and evaluates a current priority based on those water levels.

At the end of every evaluation interval the Committed Information Rate (CIR) quantum is emptied into the CSum bucket 412 and/or the ESum bucket 414. The committed burst bandwidth credit ($B_c$) dimension of the first bucket 412 represents the amount of bandwidth that a User can transmit in a burst, potentially above the CIR, and expect reliable delivery to the network. The water level of the first bucket (BpCSum) represents the amount of bandwidth accumulated by the user above the CIR rate, up to the maximum provisioned for the user ($B_c$). The maximum such credit can be advantageously set 64 k.

Thus, if the BpCSum is stable from interval to interval, the User is requesting traffic delivery at their CIR. If the BpCSum rises from interval to interval, the User is requesting traffic at a rate below their CIR and if it is falling, the User is requesting traffic at a rate above their CIR.

According to the preferred embodiment, the final priority depends on BpCSum and also on total traffic history, as computed from the below. Such is explained in more detail below.

BpEsum is the water level value in the second bucket 414, and represents the current accumulated value of unused bandwidth in excess of $CIR+B_c$ (i.e. accumulated past overflows from the first bucket 412). The ESum bucket 414 represents a cache of excess bandwidth that the user 62 can save up, to be used for longer periods of high transmission demand. Its maximum Be can be the same as Bc, e.g. 64 k.

If both levels are zero (or, equivalently, below a specified value), then priority is determined according to the past traffic volume. The level of the third bucket BpDSum is used in terms of its total capacity Bd. A total capacity Bd does not have to be defined, as will be seen in the preferred embodiment below.

The method of the invention is now described in detail with reference to FIGS. 12–14. These are referenced to specific steps of the flowchart of FIG. 11, and the concepts of FIG. 10.

Figure 12:
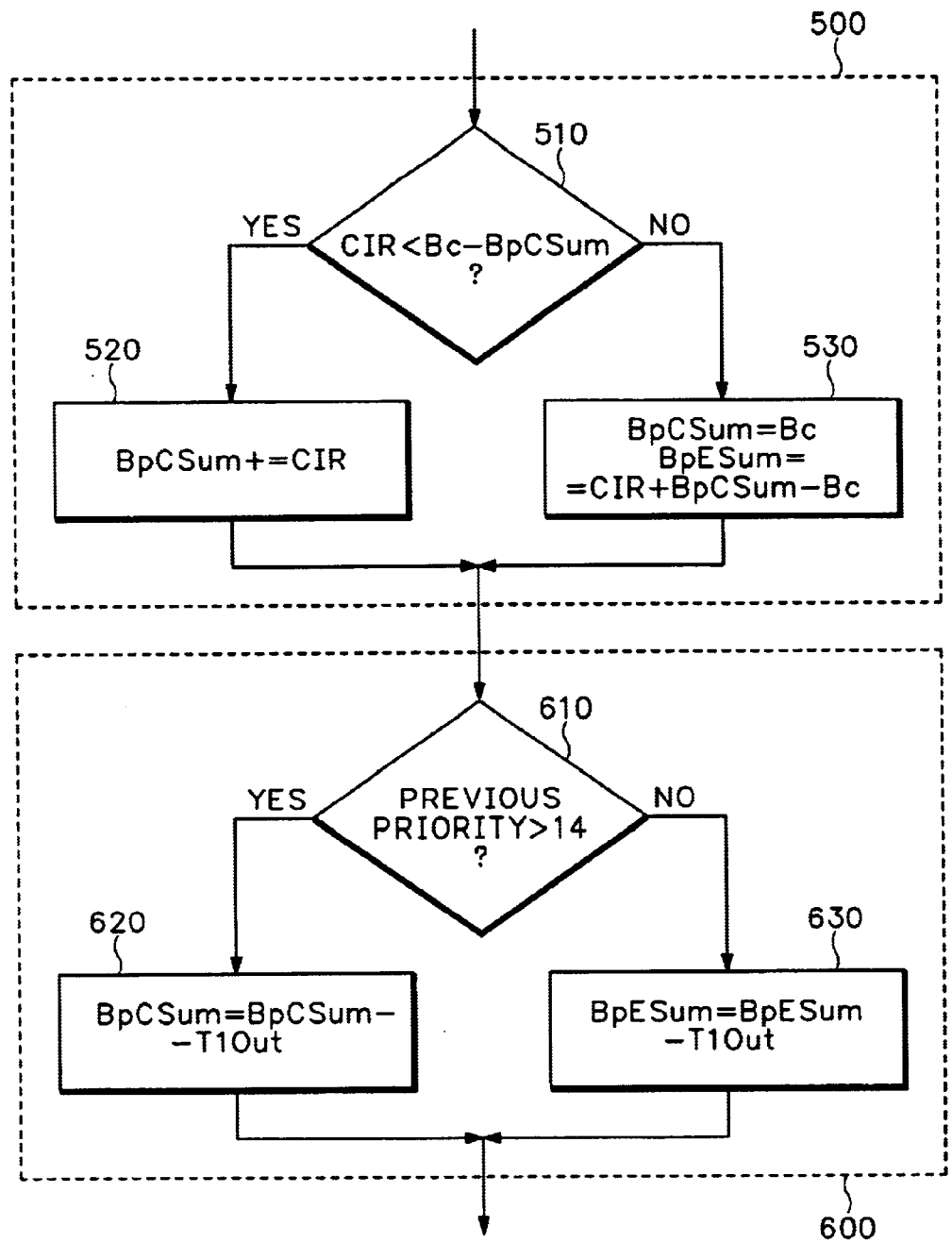
FIG. 12 is a detailed flow chart for performing two of the steps of FIG. 11.

Referring to FIG. 12, decision step 510 determines if the first bucket has room for CIR. If a complete CIR quanta can be added without overflowing, step 520 adds the next bandwidth allotment CIR quanta for the port to the water level in the first bucket 412. If the first bucket is full or has less than the CIR quanta remaining before becoming full, the first bucket is topped off, and an overflow is added to the second bucket 414 in step 530. The overflow is equal to $BpCSum+CIR-B_c$.

Decision step 610 checks the priority of the bytes that were just transmitted in the previous time interval, as it was set by the last iteration of the priority scheme. If the priority was greater than 14, the past iteration had a positive BpCSum water level, and the port is transmitting below or at $CIR+B_c$. Accordingly, step 620 subtracts the current usage T1Out from BpCSum, to spend immediate CIR. If the priority is less than or equal to 14 in this implementation, the water level in first bucket 412 was less than zero. In other words, the port was transmitting more than CIR. Since BpCSum was zero, step 630 spends from the excess bandwidth credit stored in the second bucket, by decrementing the accumulated excess bandwidth count, BpESum, by the current usage, T1Out at step 630.

Figure 13A:
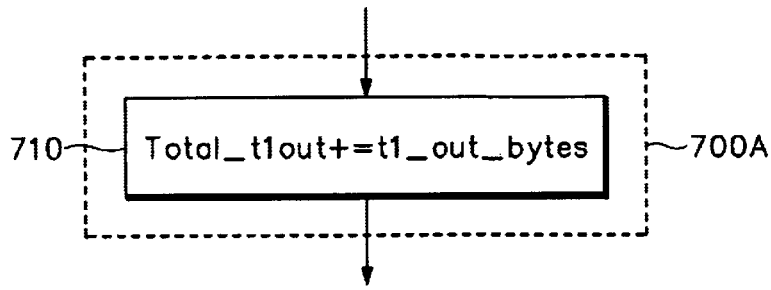
FIG. 13A is a detailed flow chart for performing an updating step 419 of FIG. 11.

Referring to FIG. 13A a straightforward method 700A is shown for implementing step 700 of FIG. 10. The total traffic volume is updated by mere incrementing, as seen in step 710. Alternately, this can include aging by using Total_t1out=t1_out_bytes+Total_t1out*(1-aging factor). Aging thus diminishes the relative contribution of older traffic.

Figure 13B:
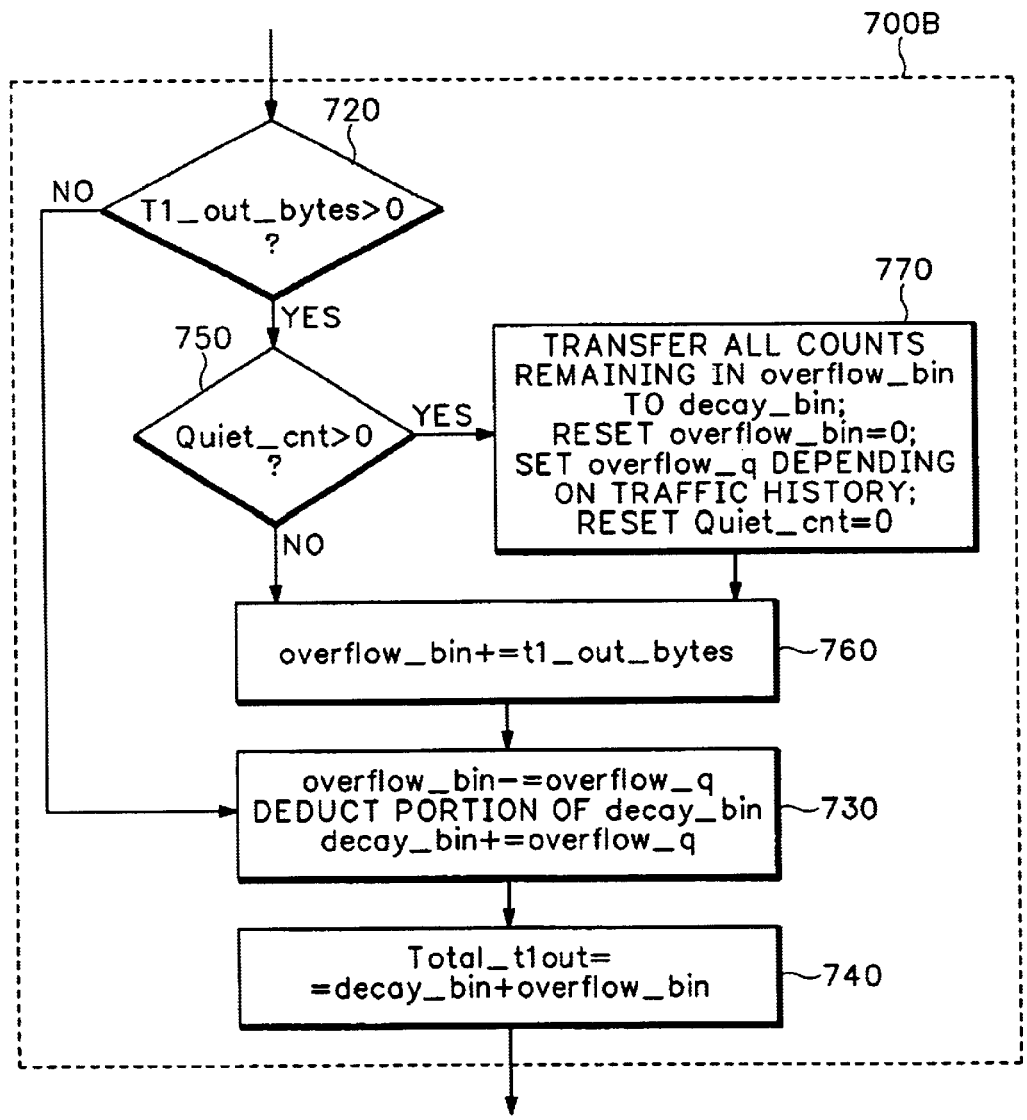
FIG. 13B is a detailed flow chart for performing the updating step of FIG. 13A further using compensation.

Referring to FIG. 13B, a method 700B can be used in lieu of method 700A. Method 700B is more sophisticated, since it permits to perform compensation, and as such is preferred. In this method, two data bins (the overflow bin and the decay bin) are adjusted. The Overflow_bin holds bytes that should not decay, the Decay_bin holds bytes that are subject to decay, and the Overflow_quantum is the amount of bytes transferred from the overflow_bin to the decay_bin.

According to step 720, it is determined if any data transfer happened in the last $1/64^{th}$ of a second. If not, then according to step 730, an overflow quantum is deducted from the overflow bin, and added to the decay bin. Further, a portion of decay bin is deducted. That is a way of performing the aging function.

Then according to a next step 740, the total traffic volume total_t1_out is added by adding the overflow bin and the decay bin.

Returning to step 720, if any data was transferred, execution proceeds to step 750. There it is determined whether this was new traffic or continuation of traffic that started more than $1/64^{th}$ of a second ago. The determination is made by checking the variable quiet count.

If it were continuing traffic, then quiet count is not larger than zero, and execution proceeds to step 760. The overflow bin is augmented by the total number of new bytes t1_out_bytes, and then execution proceeds to step 730.

If it were new traffic, execution proceeds to step 770, before going on to step 760. In step 770, quiet count is reset to zero, the contents of the overflow bin are emptied in the decay bin, the overflow bin is reset to zero, and the overflow quantum is set depending on traffic history.

The above described compensation scheme corrects also for a situation in prior art priority schemes where users with small CIR, or large frames end up sending more than their fair share.

Figure 14:
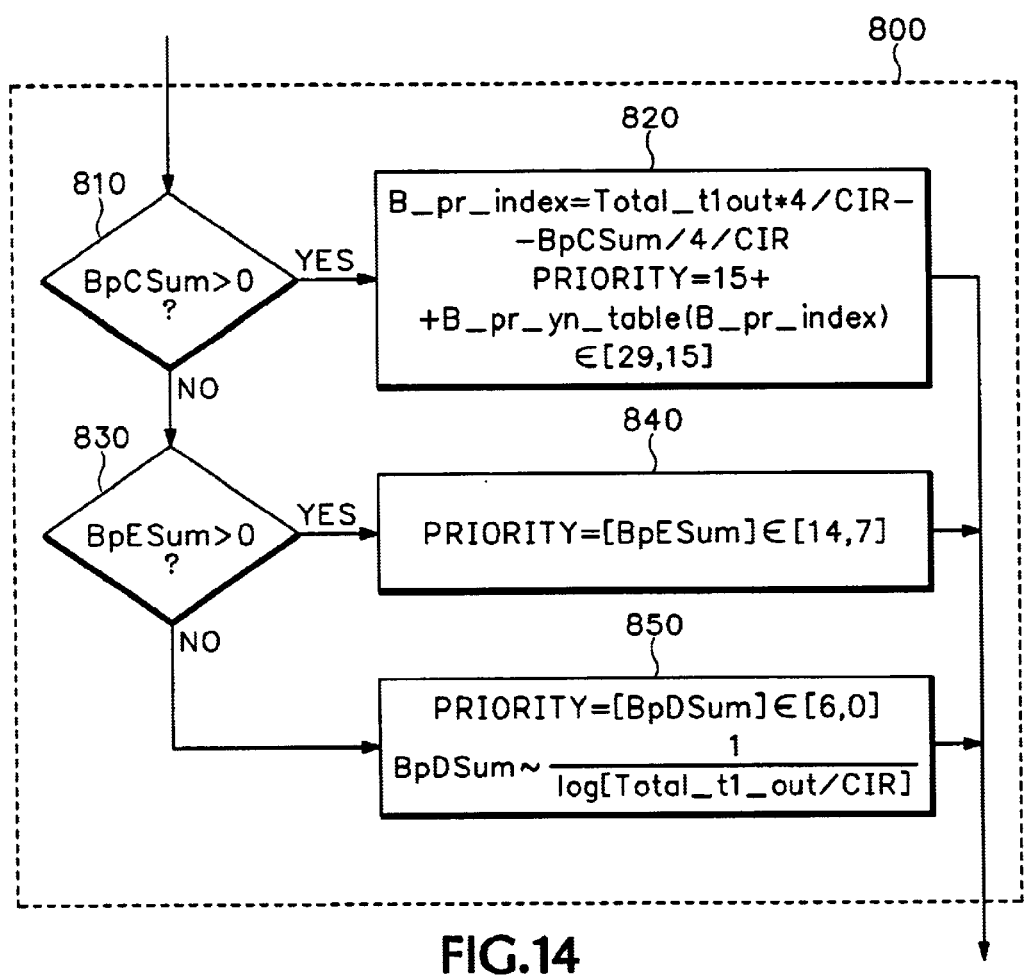
FIG. 14 is a detailed flow chart for deriving priority values according to the invention.

Referring to FIG. 14, priority is then assigned for the next iteration. The updated bucket water levels are used to determine the priority for bandwidth delivery for the forthcoming measurement interval.

Decision step 810 determines whether the water level, BpCSum in the first bucket 412 is larger than a convenient value, e.g. zero. If the water level in the first bucket 402 is positive, the water level, BpCSum, is used to derive priority in step 820, according to a correspondence (burst formula) that is described below.

If the water level BpCSum is zero, it means the User is requesting bandwidth in excess of CIR+Bc. The water level of the accumulated excess bandwidth credits, BpESum, in the second bucket 414 is then considered in step 830. If it is larger than zero, then BpESum is used to derive the priority value according to step 840. This is according to a correspondence called excess formula that is described below.

If both buckets are empty, then priority is determined according to a step 850, which implements a debt formula.

In all correspondences, the priority value is assigned to the ports using a mapping mechanism where the result value of a function is used to select an element in a constant array of priority values arranged based on the index. This allows an arbitrary mapping function to occur by the formula between the water level in any one of the buckets and the selected priority value. The priority values are assigned to ensure fairer bandwidth distribution.

The internal representation of CIR is expressed in the CIR bandwidth allocated for each measurement time interval ($64^{th}$ of a second in this implementation). Since utilization is calculated over an entire second in this implementation, a CIR value is used in the utilization calculation that is relevant to a second. Thus a scaled CIR value is used, that has been multiplied by the number of measurement intervals in the period of the measurement average. In this implementation, the CIR is multiplied by 64 measurement time intervals in the one second period of measurement average.

Formulas

A number of formulas can be chosen for each band; a number of combinations of formulas can thus be made.

Burst Formula

The result value of a function that uses BpCSum is established as an array of statically defined priority values. The values in the priority array in this implementation range from 15–29, but the range and exact relationship between index and value can be adjusted to change the priority response to bandwidth requests.

The burst formula of the scheme of the invention is a function of both total traffic volume and current watermark of burst bucket. An index is computed, according to Equation (1).

$$\text{Priority\_ary\_index} = (\text{total\_t1\_out}*4/\text{CIR} - \text{port\_BCSum}/\text{CIR}/4) \quad (1)$$

where port_BCSum is another way of writing BpCSum. The computed index is then used for looking up from a mapping table according to Equation (2):

$$\text{Burst\_priority} = 15 + \text{priority\_mapping\_table}[\text{Priority\_ary\_index}] \quad (2)$$

As can be seen from Equation (1), the burst formula includes the ratio of burst bucket credit to its CIR. The higher the credit, the higher is the priority.

Adjusting the Age of the Total Traffic Volume

Total traffic volume, total_t1out, is represented by the sum of the current traffic volume (as indicated by t1_out_bytes) and adjusted (diminished) past traffic volume. Therefore, older traffic information is less significant than newer one, and there is a theoretical maximum value for the sum. Past traffic is diminished by multiplied by an aging factor (a little bit less than one).

$$\text{total\_t1\_out} = \text{t1\_out\_bytes} + \text{total\_t1\_out} - (\text{total\_t1\_out} >> 9) \quad (3)$$

where: t1_out_bytes is the traffic volume in last $\frac{1}{64}^{th}$ second.

Total_t1out becomes the sum of a diminishing geometric series. To get an idea of its possible limit, if it is assumed that t1out_bytes is constant, then the maximum value of total_t1_out is given by:

Sum to infinity = $a + ar + ar^2 + \ldots + ar^{infinity} = a/(1-r)$

Sum to infinity = t1out_bytes$/(1-511/512) = 512*$t1out_bytes  (4)

If t1out-bytes is sent at CIR, then t1out_bytes=CIR/64  (5)

therefore, Sum to infinity=8*CIR.  (6)

The method of the invention permits retaining the entire information of traffic history. Adjusting for age is also called aging the data.

The Mapping Table

The index ranges from 0 to 63, and is mapped inversely logarithmically into 15 priority levels, as shown in the table of FIG. 15.

Performance

The present burst formula is superior to those in the prior art in all scenria.

In the event of over-subscription, the formula covers from half time under-subscription to 8 times over-subscription. This is made possible by using the logarithmic mapping of 64 steps to 15 levels.

In the event of low CIR and small frames, burst bucket credit level in the formula becomes significant. The priority step will be increased by one-fourth times the ratio of watermark over CIR. The effect is quite small for subscribers with CIR of 16 kbps (2 Kbytes) and burst bucket size of 8K, the difference between bucket empty and full are only one step. However, for subscribers with 1 kbps and 32K burst bucket, the differences could be as much as 64 steps. Therefore, such subscribers can really burst a good portion of their buckets before it slows down.

In the event of low CIR and large frames, first since this algorithm uses geometric sum to include the traffic history into total_t1out_bytes, the effect of a large frame and or low CIR would not disappear suddenly. Second, the algorithm is still favorable to subscribers with low CIR and/or large frames. Such subscribers send (relative to CIR) more than those with higher CIR and/or small frames. Fortunately, these deviations can be corrected by the above described compensation method.

For subscriber ports with the same CIR, the scheme of the invention without compensation will favor ports with large frame over those with small frame, low CIR over high CIR, by about 12% (for decay ratio of 511/512), depends on the ratio of their difference and decay power. If a decay ratio is 255/256, the difference could be up to 23%. However, when compensation is used, simulation results yield drastically different results. For decay ratio of 255/256, the throughput difference with extreme frame sizes and/or CIR is well within 5%. Compensation helps where those that send regularly and evenly (usually with small frames) appear larger in equation (3) than those who send periodically (with large frame).

Excess Formula

Similarly, there is mapping by the excess formula from the second bucket. The excess formula maps 7 to 14 to the credit level or waterline of the 64 k bucket.

Debt Formula

The remaining 7 levels, 0–6, regulate traffic when both credit buckets are empty. The formula makes use of total_t1out_bytes that keep track every $\frac{1}{64}^{th}$ second. The ratio of total_t1out_bytes to CIR, excess traffic ratio, is mapped logarithmically to levels 0 to 6, as shown in the table of FIG. 17. Therefore, traffic is still regulated even though it can be many times (16×) under-subscribed.

While the foregoing has been with reference to a particular embodiment of the invention, it will be appreciated by those skilled in the art that changes in this embodiment can be made without departing from the principles and spirit of the invention, the scope of which is defined by the appended claims.

A person skilled in the art will be able to practice the present invention in view of the present description, where numerous details have been set forth in order to provide a more thorough understanding of the invention. In other instances, well-known features have not been described in detail in order not to obscure unnecessarily the invention. All modifications coming within the spirit and scope of the accompanying claims are claimed as follows.

The invention claimed is:

1. An apparatus for assigning priority to a port, comprising:
   a first bandwidth identifier tracking an amount of preallocated bandwidth unused by the port; and
   a second bandwidth identifier tracking an amount of preallocated bandwidth for the port exceeding an overflow level indicated by the first bandwidth identifier;
   wherein a first range of values of the first bandwidth identifier is used to assign priority values in a first priority band to the port, a second range of values of the second bandwidth identifier is used to assign priority values in a second priority band to the port when the first bandwidth identifier is outside the first range, and priority values are assigned in a third priority band when the first bandwidth identifier is outside the first range and the second bandwidth identifier is outside the second range;
   wherein the priority values are assigned in the first priority band depending on a differentially aged port history of bandwidth utilization and the port history has been further compensated for a duration of a preceding quiet time period.

2. The apparatus of claim 1 wherein priority values are assigned in the first priority band depending on the complete port history.

3. An apparatus for assigning priority to a port, comprising:
   a first bandwidth monitor tracking an amount of preallocated bandwidth unused by the port;
   a second bandwidth monitor tracking an amount of preallocated bandwidth for the port exceeding an overflow level indicated by the first bandwidth monitor;
   wherein a first range of values of the first bandwidth monitor is used to assign priority values in a first priority band to the port, a second range of values of the second bandwidth monitor is used to assign priority values in a second priority band to the port when the first bandwidth monitor indicates bandwidth utilization outside the first range, and wherein priority values are assigned in a third priority band when the first bandwidth monitor is outside the first range and the second bandwidth monitor is outside the second range; and wherein priority values are assigned in the third priority band depending on a port history of bandwidth utilization.

4. The apparatus of claim 3 wherein priority values are assigned in the third priority band depending on the complete port history.

5. The apparatus of claim 3 wherein the port history has been differentially aged.

6. The apparatus of claim 5 wherein priority values are assigned in the third priority band depending on the complete port history.

7. The apparatus of claim 3 wherein the port history has been aged logarithmically.

8. The apparatus of claim 7 wherein priority values are assigned in the third priority band depending on the complete port history.

9. The apparatus of claim 3 wherein the port history has been further compensated for a duration of a preceding quiet time period.

10. The apparatus of claim 9 wherein priority values are assigned in the third priority band depending on the complete port history.

11. The apparatus of claim 9 wherein the port history has been aged logarithmically.

12. The apparatus of claim 11 wherein priority values are assigned in the third low priority band depending on the complete port history.

13. An apparatus for assigning priority to a port, comprising:
    priority circuitry tracking an amount of preallocated bandwidth unused by the port and tracking an amount of preallocated bandwidth for the port exceeding an overflow level;
    wherein a first range of values is used to assign priority values in a first priority band to the port, a second range of values is used to assign priority values in a second priority band to the port for the amount of preallocated bandwidth outside the first range, and priority values are assigned in a third priority band when the preallocated bandwidth is outside the first range and outside the second range;
    wherein the first band is a high priority band, the second band is a medium priority band, the third band is a low priority band, and wherein priority values are assigned in the third low priority band when both the first and the second priority bands indicate no available bandwidth.

14. The apparatus of claim 13 wherein priority values are assigned in the third priority band depending on a port history of bandwidth utilization.

15. The apparatus of claim 14 wherein priority values are assigned in the third priority band depending on the complete port history.

16. The apparatus of claim 14 wherein the port history has been differentially aged.

17. The apparatus of claim 16 wherein priority values are assigned in the third priority band depending on the complete port history.

18. The apparatus of claim 14 wherein the port history has been aged logarithmically.

19. The apparatus of claim 18 wherein priority values are assigned in the third priority band depending on the complete port history.

20. The apparatus of claim 14 wherein the port history has been further compensated for a duration of a preceding quiet time period.

21. The apparatus of claim 20 wherein priority values are assigned in the third priority band depending on the complete port history.

22. The apparatus of claim 20 wherein the port history has been aged logarithmically.

23. The apparatus of claim 22 wherein priority values are assigned in the third low priority band depending on the complete port history.

24. A priority scheme for assigning priority to a port assigned to a channel unit in a channel bank, the channel bank communicating packetized data over a communications link, the priority scheme comprising:
a first bandwidth identifier tracking an amount of preallocated bandwidth unused by the port;
a second bandwidth identifier tracking an amount of preallocated bandwidth for the port exceeding an overflow level identified by the first bandwidth identifier;
wherein priority values in a first priority band are assigned to the port according to the first bandwidth identifier and to a differentially aged port history of bandwidth utilization, and
wherein priority values in a second priority band are assigned to the port according to the second bandwidth identifier and the port history has been further compensated for a duration of a preceding quiet time period.

25. The priority scheme of claim 24 wherein the port history of bandwidth utilization has been aged by progressively discounting weights of earlier bandwidth utilization data.

26. The priority scheme of claim 25 wherein discounting has been performed by multiplying each earlier weight by an aging fraction.

27. The priority scheme of claim 25 wherein discounting has been performed over the complete port history.

28. A method for assigning priority to users for communicating over a communications link, the method comprising:
tracking a first bandwidth credit level associated with an amount of unused bandwidth allotted to the users;
tracking a second bandwidth credit level that tracks an amount by which the first bandwidth level exceeds an overflow level;
tracking a port history of bandwidth utilization;
differentially aging the port history;
assigning a priority value according to the first bandwidth credit level and the differentially aged port history when the first bandwidth credit level is above zero;
assigning a priority value according to the second bandwidth credit level when the first bandwidth credit level is zero; and
compensating for a duration of a preceding quiet time period.

29. The method of claim 28 wherein the aging step includes progressively discounting weights of earlier bandwidth utilization data.

30. The method of claim 29 wherein discounting includes multiplying each earlier weight by an aging fraction.

31. The method of claim 30 wherein discounting is performed over the complete port history.

32. A method for assigning priority to ports for communicating over a communications link, the method comprising:
tracking a first bandwidth credit level associated with an amount of unused bandwidth allotted to the ports;
tracking a second bandwidth credit level that tracks an amount by which the first bandwidth level exceeds an overflow level; tracking a port history of bandwidth utilization;
differentially aging the port history;
assigning a priority value according to the first bandwidth credit level and the differentially aged port history when the first bandwidth credit level is above zero;
assigning a priority value according to the second bandwidth credit level when the first bandwidth credit level is zero;
tracking a bandwidth debit level that tracks an amount by which the first bandwidth credit level and the second bandwidth credit level are zero; and
assigning a priority value according to the bandwidth debit level when the first and second bandwidth credit levels are zero instead of according to the second bandwidth credit level.

33. The method of claim 32 wherein the aging step includes progressively discounting weights of earlier bandwidth utilization data.

34. The method of claim 33 wherein discounting includes multiplying each earlier weight by an aging fraction.

35. The method of claim 33 wherein discounting is performed over the complete port history.

36. The method of claim 32, further including compensating for a duration of a preceding quiet time period.

37. The method of claim 36 wherein the aging step includes progressively discounting weights of earlier bandwidth utilization data.

38. The method of claim 37 wherein discounting includes multiplying each earlier weight by an aging fraction.

39. The method of claim 38 wherein discounting is performed over the complete port history.

40. A method for assigning priority for communicating over a communications link, the method comprising:
assigning a priority value to a port according to a bandwidth debit level;
compensating the priority value according to a duration of a preceding non-transmission period for the port associated with the priority value;
tracking a port history of bandwidth utilization and assigning the priority value according to the port history; and
logarithmically aging a time value associated with the port history and assigning the priority value according to the logarithmically aged time value.

41. A method for assigning priority for communicating over a communications link, the method comprising:
tracking a first bandwidth credit level associated with an amount of unused allotted bandwidth;
tracking a second bandwidth credit level that tracks an amount by which the first bandwidth level exceeds an overflow level;
tracking a bandwidth debit level that tracks an amount by which the first bandwidth credit level and the second bandwidth credit level are zero;
assigning a priority value according to the first bandwidth credit level when the first bandwidth credit level belongs in a first range of values;

assigning a priority value according to the second bandwidth credit level when the first bandwidth credit level is outside the first range and the second bandwidth credit level belongs in a second range of values;

assigning a priority value according to the bandwidth debit level when the first bandwidth credit level is outside the first range and the second bandwidth credit level is outside the second range;

tracking a port history of bandwidth utilization, and wherein assigning according to the bandwidth debit level is performed according to the port history; and aging the port history wherein aging is performed logarithmically.

42. A method for assigning priority for communicating over a communications link, the method comprising:

tracking a first bandwidth credit level associated with an amount of unused allotted bandwidth;

tracking a second bandwidth credit level that tracks an amount by which the first bandwidth level exceeds an overflow level;

tracking a bandwidth debit level that tracks an amount by which the first bandwidth credit level and the second bandwidth credit level are zero;

assigning a priority value according to the first bandwidth credit level when the first bandwidth credit level belongs in a first range of values;

assigning a priority value according to the second bandwidth credit level when the first bandwidth credit level is outside the first range and the second bandwidth credit level belongs in a second range of values;

assigning a priority value according to the bandwidth debit level when the first bandwidth credit level is outside the first range and the second bandwidth credit level is outside the second range;

tracking a port history of bandwidth utilization, and wherein assigning according to the bandwidth debit level is performed according to the port history;

tracking a duration of a preceding quiet time period, and wherein assigning according to the bandwidth debit level is also performed according to the duration; and differentially aging the port history.

43. A network processing device, comprising:

a priority control circuit configured to assign a priority value according to a first bandwidth credit level when a bandwidth credit is in a first range of values and assigning the priority value according to a second bandwidth credit level when the bandwidth credit is outside a first range and in a second range of values;

the priority control circuit configured to assign the priority value according to a bandwidth debit level when the bandwidth credit is outside the first and second range; and wherein the priority control circuit is configured to assign the priority value according to a logarithmically weighted port utilization history.

44. A method for assigning a priority value in a network processing device, comprising:

assigning a priority value according to a first bandwidth credit level when a bandwidth credit is in a first range of values;

assigning the priority value according to a second bandwidth credit level when the bandwidth credit is outside a first range and in a second range of values;

assigning the priority value according to a bandwidth debit level when the bandwidth credit is outside the first range and the second range;

tracking a port history of bandwidth utilization;

logarithmically weighting the port history; and assigning the priority value according to the logarithmically weighted port history.

45. A method for assigning a priority value in a network processing device, comprising:

assigning a priority value according to a first bandwidth credit level when a bandwidth credit is in a first range of values;

assigning the priority value according to a second bandwidth credit level when the bandwidth credit is outside a first range and in a second range of values; and assigning the priority value according to a bandwidth debit level when the bandwidth credit is outside the first range and the second range;

assigning the priority value according to a port bandwidth utilization history; and logarithmically aging the port bandwidth utilization history.

46. A system for assigning a priority value in a network processing device, comprising:

means for assigning a priority value to a port in the network processing device;

means for tracking a duration of a preceding non-utilization period for the port;

means for assigning the priority value according to the tracked non-utilization duration;

means for assigning the priority value according to a port bandwidth utilization history; and means for logarithmically aging the port bandwidth utilization history.

47. A system for assigning a priority value in a network processing device, comprising:

means for assigning a priority value according to a first bandwidth credit level when a bandwidth credit is in a first range of values;

means for assigning the priority value according to a second bandwidth credit level when the bandwidth credit is outside a first range and in a second range of values; and means for assigning the priority value according to a bandwidth debit level when the bandwidth credit is outside the first range and the second range;

means for assigning the priority value according to a port bandwidth utilization history; and means for logarithmically aging the port bandwidth utilization history.

48. A computer readable medium for assigning a priority value in a network processing device, the computer readable medium comprising:

assigning a priority value to a port associated with the network processing device;

tracking a duration of a preceding non-utilization period for the port;

assigning the priority value according to the tracked non-utilization duration;

assigning the priority value according to a port bandwidth utilization history; and logarithmically aging the port bandwidth utilization history.

49. A computer readable medium for assigning a priority value in a network processing device, the computer readable medium comprising:

assigning a priority value to a port associated with the network processing device;

tracking a duration of a preceding non-utilization period for the port;

assigning the priority value according to the tracked non-utilization duration;

tracking the first bandwidth credit level according to an amount of unused bandwidth allotted to a port;

tracking the second bandwidth credit level according to an amount the first bandwidth level exceeds an overflow level;

tracking the bandwidth debit level when the first bandwidth credit level and the second bandwidth credit level are zero;

assigning the priority value according to a port bandwidth utilization history; and logarithmically aging the port bandwidth utilization history.

* * * * *

UNITED STATES PATENT AND TRADEMARK OFFICE
CERTIFICATE OF CORRECTION

PATENT NO. : 6,781,956 B1
DATED : August 24, 2004
INVENTOR(S) : Cheung

It is certified that error appears in the above-identified patent and that said Letters Patent is hereby corrected as shown below:

Column 21,
Line 63, "BCSum/CIR/4)(;1)" should read -- BCSum/CIR/4);   (1) --.
Line 67, "[Priority_ary_index(;2])" should read -- [Priority_ary_index];   (2) --.

Column 27,
Line 17, "allotted bandwidth:" should read -- allotted bandwidth; --.

Signed and Sealed this

First Day of February, 2005

JON W. DUDAS
*Director of the United States Patent and Trademark Office*